(12) United States Patent
Shayegan et al.

(10) Patent No.: US 6,795,793 B2
(45) Date of Patent: Sep. 21, 2004

(54) METHOD AND APPARATUS FOR EVALUATING DATA AND IMPLEMENTING TRAINING BASED ON THE EVALUATION OF THE DATA

(75) Inventors: Darius K. Shayegan, Carlsbad, CA (US); Stephen M. Stahl, Rancho Santa Fe, CA (US); Tucker S. McElroy, San Diego, CA (US); Erik B. Sudderth, Jamaica Plain, MA (US)

(73) Assignee: Med-Ed Innovations, Inc., Carlsbad, CA (US)

( * ) Notice: Subject to any disclaimer, the term of this patent is extended or adjusted under 35 U.S.C. 154(b) by 76 days.

(21) Appl. No.: 10/199,969

(22) Filed: Jul. 19, 2002

(65) Prior Publication Data

US 2004/0015329 A1 Jan. 22, 2004

(51) Int. Cl.⁷ .............................................. G06F 7/00
(52) U.S. Cl. ...................... 702/179; 702/186; 702/188; 702/198
(58) Field of Search ................................ 702/179, 186, 702/188, 198, 128, 176, 177, 181, 182; 379/15.02; 705/8, 7, 10; 717/106

(56) References Cited

U.S. PATENT DOCUMENTS

| | | | | |
|---|---|---|---|---|
| 6,028,901 A | * | 2/2000 | Huynh et al. | 375/350 |
| 6,292,830 B1 | * | 9/2001 | Taylor et al. | 709/224 |
| 2003/0014428 A1 | * | 1/2003 | Mascarenhas | 707/200 |
| 2003/0018513 A1 | * | 1/2003 | Hoffman et al. | |
| 2003/0050879 A1 | * | 3/2003 | Rosen et al. | 705/35 |
| 2003/0086536 A1 | * | 5/2003 | Salzberg et al. | 379/15.02 |
| 2003/0115128 A1 | * | 6/2003 | Lange et al. | 705/37 |

* cited by examiner

*Primary Examiner*—Marc S. Hoff
*Assistant Examiner*—Felix Suarez
(74) *Attorney, Agent, or Firm*—Thomas F. Lebens; Fitch, Even, Tabin & Flannery

(57) ABSTRACT

The present invention provides systems and methods for statistically analyzing collected data and providing training for the collection of the data. In one embodiment, the system and method are configured to collect data about a plurality of objects and determine a measure of agreement between the collected data and a benchmark. Based on the measure of agreement reliability and a variance of the collected data are determined relative to the benchmark. In training a plurality of raters are instructed to rate at least one of a plurality of objects such that each rater collects data that rates at least one of the objects. A measure of agreement of the data collected by a rater is determined relative to the benchmark, and reliability and variance of the data collected are determined, which are used to evaluate the rater.

8 Claims, 6 Drawing Sheets

METHOD AND APPARATUS FOR EVALUATING DATA AND IMPLEMENTING TRAINING BASED ON THE EVALUATION OF THE DATA

BACKGROUND OF THE INVENTION

1. Field of the Invention

The present invention relates generally to the analysis of data, and more specifically to statistically evaluating subjective data as well as training individuals based on the evaluation.

2. Discussion of the Related Art

Many measurement tools take the form of surveys or questionnaires. Often times these formats allow measurements to be derived subjectively, through their implementation in the form of a comprehensive diagnostic evaluation of certain subject matter. Application of these subjective measurement tools typically require an individual administering or performing the survey to follow a pre-defined set of querying conventions and/or guidelines, as a means to ensure proper administration of the technique within the context of the subject matter to which it is applied. Standardizing the implementation practice of the measurement tool in this fashion considerably enhances both the reliability and validity of the overall measurement. Furthermore, many subjective rating tools are broad in their design, allowing them to be employed in the assessment of a wide variety of subject matter.

For example, clinical research investigators commonly employ subjective rating scales to measure the effects of novel pharmaceutical agents on the treatment of various medical disorders. However, many disorders manifest an extremely large and complicated spectrum of symptoms, requiring research investigators to further modify the rating scale's conventions governing precise implementation of the measurement practice, so that it becomes specialized to the degree it may accurately assess minute symptom characteristics specifically defined within the scope of the research study.

Due to the extraordinary number of research trials many clinical investigators are involved in multiple different simultaneous research studies which apply the same subjective rating scales, but do so utilizing different conventions of outlining techniques. These situations have given rise to a great deal of confusion among investigators, contributing both to an increased variability of observed measurement outcomes, as well as an overall decrease in the reliability of accrued measurements, which ultimately corresponds to invalid measurement data.

SUMMARY OF THE INVENTION

The present invention advantageously addresses the needs above as well as other needs by providing an apparatus and method for statistically evaluating the validity and reliability of collected data, and for the training of individuals in evaluating objects to collect the data. In one embodiment, the invention can be characterized as a method for analyzing collected data, including collecting data about a plurality of objects; determining a measure of agreement between the collected data and a benchmark; determining a reliability of the collected data; and determining a variance of the collected data relative to the benchmark.

In another embodiment, the invention can be characterized as a method for training a plurality of raters for rating at least one of a plurality of objects, including instructing a plurality of raters regarding performing a rating of at least one of a plurality of objects; allowing each of the plurality of raters to collect data that rates at least one of the plurality of objects; determining a measure of agreement of the data collected by a single rater with benchmark data; determining the reliability of the data collected by the single rater; determining the variance of the data collected by the single rater relative to the benchmark data; and evaluating the single rater relative to the benchmark data.

In another embodiment, the invention can be characterized as a method of statistically analyzing data, including collecting a plurality of sets of data based from a plurality of evaluations of an object, where each set of data includes a plurality of data; comparing each set of data with each of the other sets of data; determining a deviation of the sets of data; and determining a difficulty in evaluating the object based on the determination of the deviation of the sets of data.

In another embodiment, the invention can be characterized as a method of statistically analyzing data, comprising the steps of collecting a plurality of sets of data based from a plurality of evaluations of an object, where each set of data includes a plurality of data; comparing each set of data with each of the other sets of data; determining a deviation of the sets of data; and determining a difficulty in evaluating the object based on the determination of the deviation of the sets of data.

In another embodiment, the invention can be characterized as a system for statistically analyzing data. The system includes means for collecting a set of data from a rater; means for comparing the set of data with a standards of convention; means for determining a distance measure between the set of data and the standards of convention; means for evaluating the set of data based on the distance measure; and means for certifying the data if the evaluation exceeds a threshold.

A better understanding of the features and advantages of the present invention will be obtained by reference to the following detailed description of the invention and accompanying drawings that set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

Figure 1:
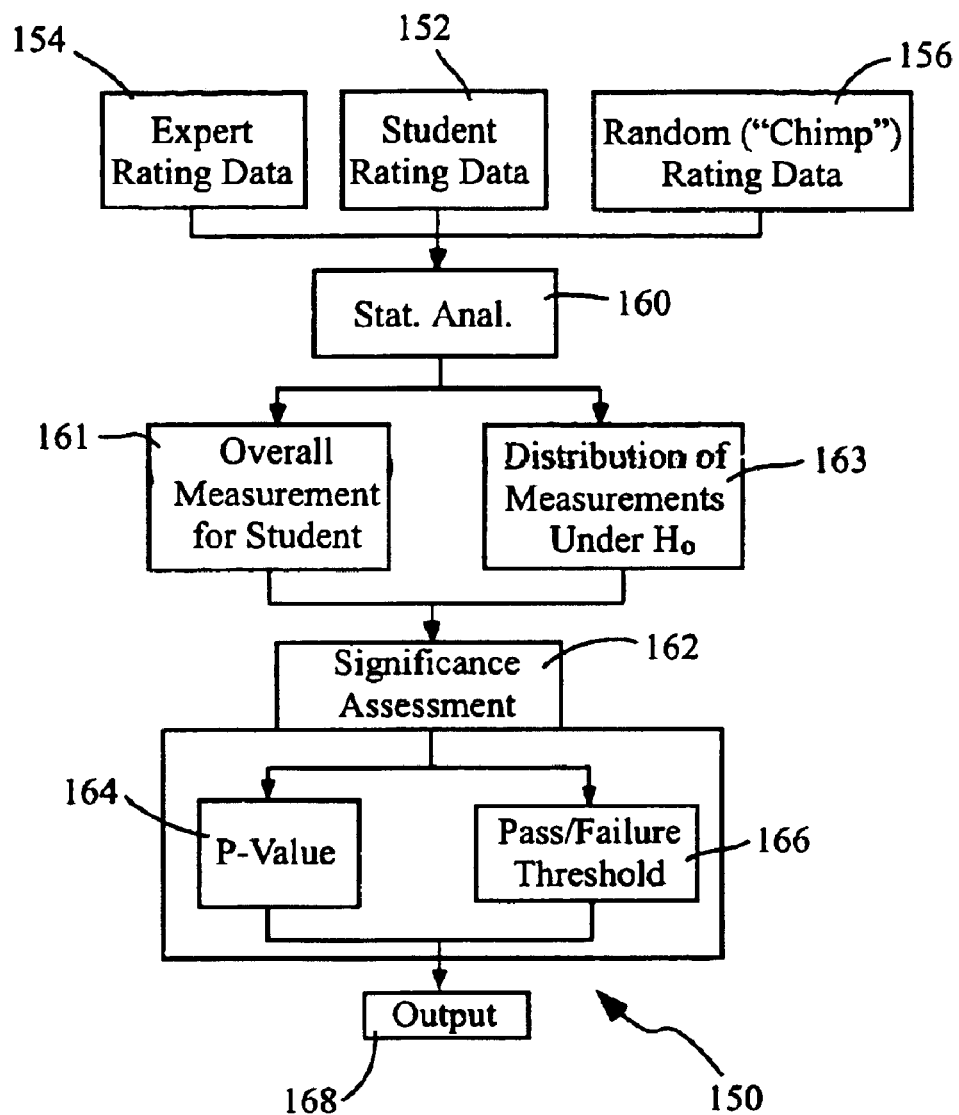
FIG. 1 shows a simplified flow diagram of a process for evaluating collected data about an object relative to a benchmark.

The following description is not to be taken in a limiting sense, but is made merely for the purpose of describing the general principles of the invention. The scope of the invention should be determined with reference to the claims.

The present invention provides for a method and apparatus for statistically analyzing data to determine a relationship and/or comparison of the data in relation to a benchmark, standard or desired result. The present method and apparatus is particularly effective with data collected through subjective environments or subjective measures.

The method and apparatus of the present invention additionally provides for the generation of the benchmark or standard. Additionally, the present invention provides for the collection of data and the analysis of data in determining the benchmark. Further, the present invention provides for analyzing benchmark data to verify the benchmark. The method and apparatus additionally provide for a determination of difference or non-consensus within the benchmark allowing weighting of statistical analysis based on the amount of non-consensus found within the benchmark.

The present method and apparatus provide training for conducting subjective tests. The present method and apparatus additionally includes the ability to process the results of the statistical analysis and to adjust training of individuals based on the results in an attempt to improve training and thus the individuals performance. The present invention is capable of determining a measure of agreement of data compared with the benchmark. The present invention is further configured to provide comparisons of individuals being trained relative to the benchmark.

In statistically analyzing data, the present invention evaluates a collection of data submitted from a plurality of different inputs and compares the plurality of different inputs relative to the benchmark. Further, the analysis compares the plurality of different inputs and can rank or prioritize each input relative to the other inputs and the benchmark.

As discussed above, the present invention is particularly effective in the evaluation of collected subjective data. For example, a plurality of objects are evaluated and a collection of data is compiled for each object. As a further example, a first amount of data (d1) is collected about a first object, a second amount of similar data (d2) is collected about a second object, a third amount of similar data (d3) is collected about a third object, and so forth for N objects. Each amount of data and/or subsets of the amount of data are statistically analyzed and compared with a benchmark.

Based on the comparison with the benchmark, for example a measurement of agreement or disagreement, the present invention is capable of comparing the statistical results of each amount of data (e.g., d1) and/or subset of data relative to the other amounts of data (e.g., d2 and d3) and/or subsets of data with respect to the benchmark. For example, five individuals may collect data about the first object providing five subsets of data ($d1_1$, $d1_2$, $d1_3$, $d1_4$, $d1_5$) equaling the first amount of data (d1), three individuals collect data about the second object providing three subsets of data ($d2_1$, $d2_2$, $d2_3$) for the second amount of data (d2) and two individuals collect data about the third object ($d3_1$, $d3_2$) providing the third amount of data (d3). However, a single individual can collect data for more than one object, for example a first individual can be one of the five individuals collecting data for the first object, one of the three individuals collecting data for the second object and one of the two individuals collecting data for the third object. Each of the subsets of data is evaluated relative to the benchmark and the resulting measures for each subsets is used to determine reliability, consistency, validity and other statistical evaluations, as well as evaluating each individuals collection of data relative to the other individuals as determined relative to the benchmark.

In one embodiment, the benchmark is based on ideal results regarding the objects. However, in subjective evaluations, there is not typically an ideal result. In one embodiment, the benchmark is generated through a collection of data from one or more "experts" on the objects being evaluated. This expert data can be established based on a general agreement within an industry, a general agreement between a large sample of data, through a collection of data from individuals identified as experts in a field of interest or through other similar ways for collecting data.

For example, the benchmark can be generated from a set or subset of individuals invited to participate based upon their exhibition of extraordinary performance and contributions within a field encompassing the specified measurement technique (or combination of techniques) relative to their peers. For example, a scientific research expert candidate may be initially sought out based upon the quality and impact of his or her research contributions to a particular field, as they are demonstrated through standardized mechanisms of documentation, such as academic journals, published peer reviews, and public opinion polls. Alternate or additional selection criteria may include obtaining formal and informal recommendations of various organizations of which the candidate is a member of or associated with by trade. For example, nomination of a medical research opinion leader may involve recommendations from the American Medical Association, the Food and Drug Administration, various pharmaceutical or medical equipment manufacturers that produce tools/treatments relevant to the scope of the expert candidates' perceived field of knowledge, depending on the object being evaluated. Other criteria and qualifications can be reviewed in determining whether an individual is utilized to form the benchmark.

Additionally, an individual can be classified as an expert based on performance of administering evaluations and an analysis of the performance based on criteria according the present invention, as is described fully below.

Once selected as an expert candidate, the individual may undergo various tests in order to further quantitate the experts' level of knowledge and "expertise" directly related to the process of performing the subjective measurement techniques they ultimately are responsible for standardizing. One example is utilizing a panel of four expert candidates who are required to participate in and complete a model training exercise that is ultimately used to train and/or assess the performance of other individuals not previously classified as experts.

In one embodiment, each expert candidate participates in a training exercise where each expert candidate judges two sample objects, such as two patient subjects (subject A and subject B using the Hamilton Depression Rating Scale (HAMD) technique). The rating scores contributed by each candidate are subsequently collected (through substantially any means, such as electronically or by an equivalent method such as handwritten) and submitted into the analytical process of the present invention (as further described below) for statistical examination. Once scores are collected, the group of candidates may be asked to explain and/or defend in detail the reasoning behind their contribution of each rating score, so that an informal analysis of results may be conducted (and documented) within the group of candidates through discussion, or other alternative formats. This provides for the tangible determination of what is deemed to be acceptable and/or valid performance regarding implementation of the exercised subjective measurement technique (e.g., the HAMD rating scale) within the context of the provided subject matter (i.e. patient subjects A, and B).

The rough measures produced by the expert groups' informal analysis are contrived as a probationary set of standards that govern acceptable practice of the subjective measurement technique. The probationary set of standards can consequently provide the benchmark basis in which to compare the rating scores of others (experts, and non-experts), for the purpose of assessing reliability and validity of performance demonstrated by such individuals within pre-existing or future iterations of the same or similar training exercises.

Assumptions concerning the accuracy and precision of the four expert candidate's rating scores can be investigated and/or verified using a differential application of the analytical methods described below and with known measurement methods. Several classical measurements of reliability and validity that may be relevant and applicable to the four expert candidate example include typical errors of measurement expressed as the coefficient of variation (e.g., within-subject standard deviation (standard error of measurement)); change in the mean, for assessment of possible random or systematic change in the mean of collected rating score values; retest correlation using the Pearson correlation coefficient or intra-class correlation coefficient (ICC); Chronbach's coefficient alpha measurement of internal consistency variety concerning the retest of a single scale item; reliability of nominal variables using Cohen's Kappa coefficient, or weighted Kappa coefficient for ordinal variable sets; quantifying the extent of deviance of multiple examiners not in consensus; and other such measurements.

If the analytical process finds a candidate's rating score data to be reliable and congruent with the results of other experts and/or expert candidates, the candidate can be promoted to the status of expert. Likewise, it is possible for an expert to be demoted if their future performance within similar training exercises adheres poorly to the collective expert predicate. Thus, the present invention facilitates the formation and validation of the expert advisory board dynamically, to aid in ensuring that methodological criteria is continually scrutinized, maintained, and conducted in a manner that is substantially the same as the activity it is responsible for standardizing.

One example of an implementation of the present invention is the evaluation of subjective data collected on a plurality of subjects, where the data reflects observed characteristics about the subjects. An example of this subject collection of data can be from a survey or questionnaire.

The present invention is capable of providing accurate and critical analysis of collected subjective data by, in part providing precise analysis of the data to verify the consistency of the methods for collecting the data, to verify the validity of the methods for collecting the data and to provide significance assessments of the process of collecting the data. Previous methods and systems fail to provide these verifications. The present invention additionally provides verification of the accuracy of data with respect to a desired method employed to collect the data. The present invention further allows for accurate training of individuals performing surveys to further aid in ensuring the accuracy of the data collected.

Previous methods and systems for standardizing subjective measurement techniques are haphazard and do not permit established conventions to be easily documented or archived in a practical format that allow them to be tangibly accessible for the purposes of educational and diagnostic review. Thus, it is not only difficult to ensure that performance assessments are reliably conducted in accordance with a particular set of standardized conventions, but it is also difficult to reliably create educational content and training environments that effectively educate investigators about the underlying principles of such conventions. As a consequence, the majority of previous educational programs are not equipped to provide training that accommodates specific standardization of the measurement practice, relative to the scope of the investigation.

Detailed assessments of investigator performance are often not attempted by previous systems and methods, and proficiency of the investigator is simply granted based upon an investigator's mere attendance at a training program. Previous training models that do take into account specialized standards do not have effective mechanisms to assess or even document investigator performance over time, and are thus not capable of providing supplemental education to investigators throughout the complete duration of an investigation.

The present method and system provide an approach to minimizing result variability of subjective measurement techniques, especially when parallel applications of different conventions are required. Further, the present method and system provide an educational mechanism that allows education of one or more investigators to become specific to their interpreted strengths and weaknesses, and remain available as needed for calibration purposes, beyond the initial training session.

Again referring to the above example of the collection of data (d1, d2 and d3) for three objects, the present invention utilizes the established benchmark to evaluate the data. FIG. 1 shows a simplified flow diagram of a process 150 for evaluating collected data 152 about an object relative to the benchmark 154. The collected data 152 and the benchmark data 154 are forwarded to step 160 where statistical analysis is performed on the collected data to determine overall measures 161 of the collected data or for subsets of the measured data. The results from the statistical analysis are forwarded to step 162 where a significance assessment is performed. In one embodiment, the significance assessment includes step 164 for determining a quantitative significance assessment through, at least in part, the generation of a p-value (described fully below). The significance assessment 162 can additionally include step 166 where a threshold evaluation is performed on the statistical analysis results from step 160. The process generates an evaluation 168 of the collected data 152.

In one embodiment, the process 150 receives random rating data 156 as an input. The random rating data is processed in the statistical analysis step 160. The statistical analysis step generates a distribution of measurements 163 based at least in part on the random rating data. The distribution of measurements is used in the significance assessment step 162, as is further described below.

Figure 2:
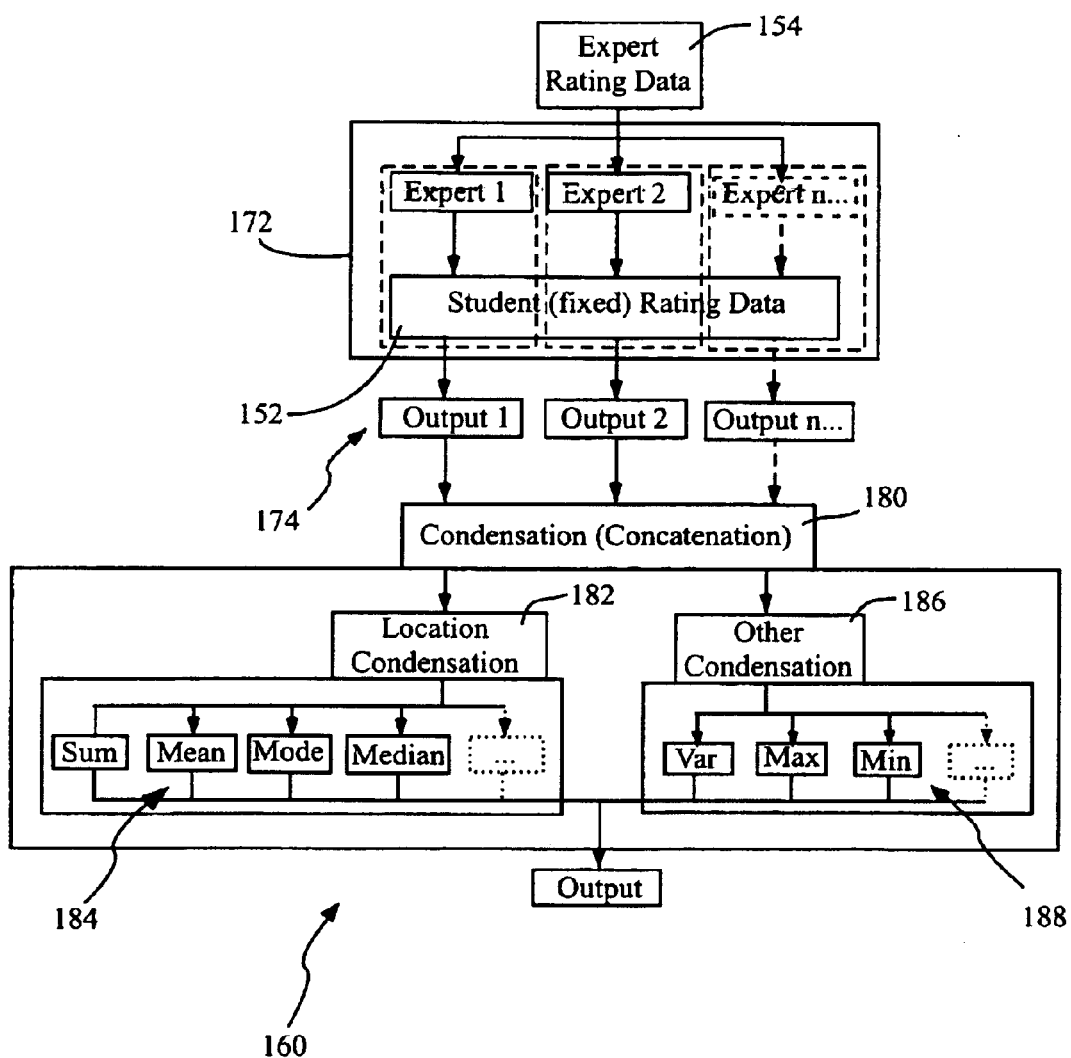
FIG. 2 depicts a simplified flow diagram of a statistical analysis process shown in FIG. 1 according to one embodiment of the present invention.

FIG. 2 depicts a simplified flow diagram of a statistical analysis process 160 according to one embodiment of the present invention. The benchmark data 154, the student data 152 and in some embodiments the random data 156 are forwarded to step 172 where metrics are generated for statistical analysis. The step for generating metrics 172 performs analysis of the collected data relative to the benchmark. In one embodiment, the benchmark comprises data from a plurality of experts J1 through Jn. In the step of generating metrics 172, each expert J1–Jn can be compared with the collected data 152. In step 172 metric outputs 174 are generated with respect to each expert J (outputs 1 through n). The metric outputs 174 are forwarded to step 180 where condensation and/or concatenation of the metrics is performed. In one embodiment, the step of condensing the metrics includes step 182 where location condensation is performed. The location condensation 182 generates statistical location measures 184, such as but not limited to, sum, mean, mode, median and other similar statistical measures to be used in the process 150 of evaluating the collected data (see FIG. 1). The condensation step can additionally include step 186 where other condensation measures can be performed. The step of generating other condensations 186 generates other statistical measures 188 of the evaluation of the collected data relative to the benchmark, such as but not limited to, variance, maximum values, minimum values and other such measures.

Figure 3:
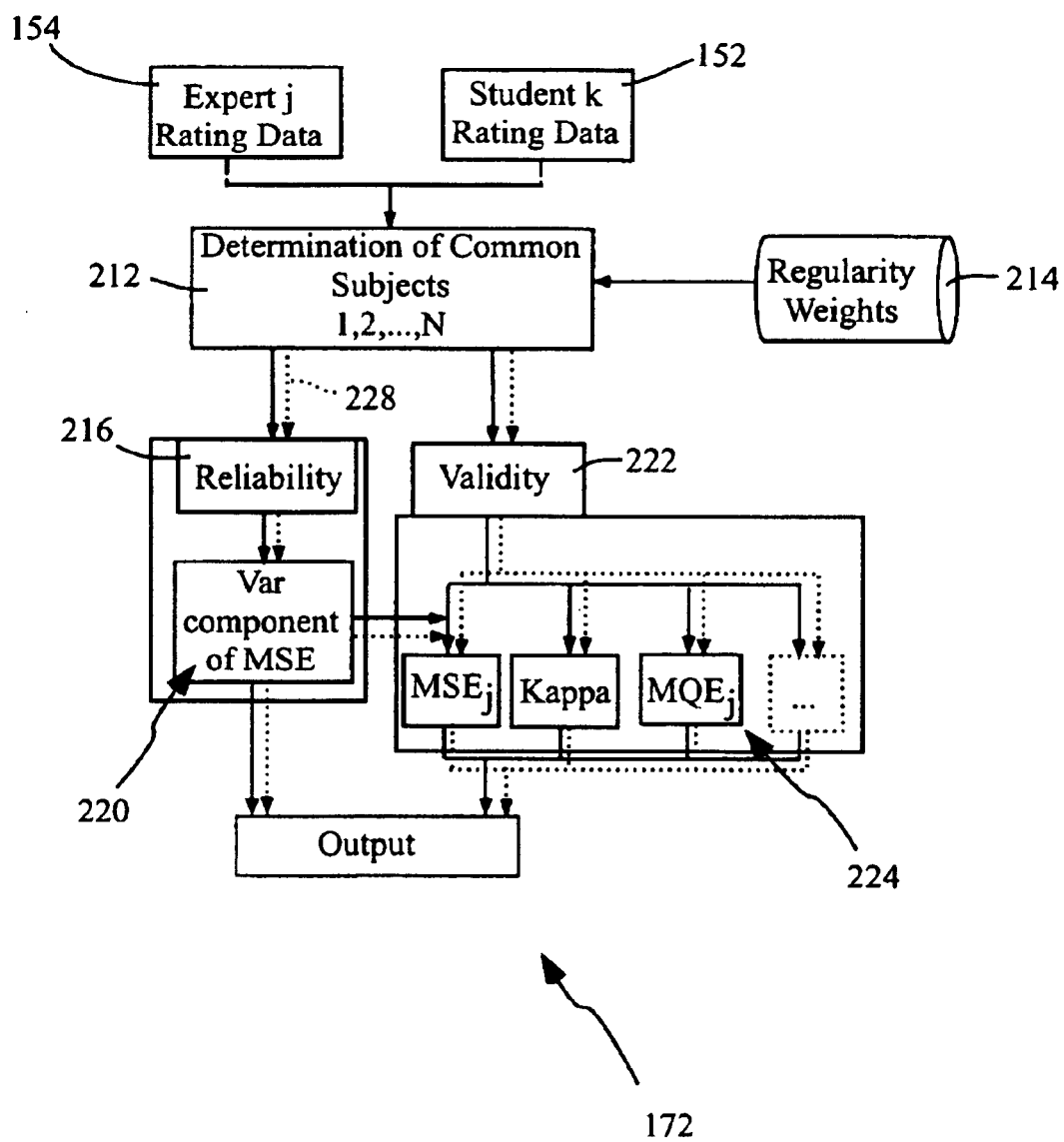
FIG. 3 depicts a simplified flow diagram of one implementation of a metric generation step shown in FIG. 2 according to one embodiment of the present invention

FIG. 3 depicts a simplified flow diagram of one implementation of the metric generation step 172 according to one embodiment of the present invention. As discussed above, in some embodiments the data collected is collected from a plurality of individual investigators or raters K1 through Kn. In one embodiment, the metric generation step 172 receives benchmark data 154 from one of the experts (e.g., J1) and collected data 152 from one of the raters (e.g., K1). In step 212 the process determines which of the plurality of objects or subjects being investigated were evaluated by both the expert J1 and the rater K1, thus obtaining a number, distribution or list of commonly evaluated objects. In one embodiment, regularity weights 214 (described in detail below) are supplied to step 212. The regularity weights can be used to provide adjustments to the collected data and/or expert data to compensate for erraticity and/or difficulty in evaluating the objects. Once the common objects evaluated by both the expert J1 and the rater K1 are determined, the collected data and the expert evaluation data for each common object is forwarded to step 216. In step 216 the reliability of the collected data is evaluated, where the reliability typically provides a measure of internal consistency of the raters evaluation (reliability is typically not based on inter-rater reliability or rater K1 compared with other raters (K2–Kn)). The step of determining reliability 216 of the collected data generates reliability metrics 220. The reliability metrics 220 can include any number of metrics, such as a variance component of a Mean Squared Error (MSE), a variance component of a generalized and/or weighted MSE (as described fully below), and other such metrics.

The collected data and the expert evaluation data for each common object are forwarded to step 216 where the validity of the collected data is evaluated. The validity step 222 generates one or more validity metrics 224, such as MSE, generalized and/or weighted MSE, Kappa coefficient, mean quartic error (MQE) and other such validity metrics. In one embodiment, the reliability metric 220 is supplied to the validity step 222 (or vise versa) to further aid in determining validity metrics and reduce the amount of computational overhead.

In one embodiment, the metric generation step 172 additionally generates statistical metrics based on random rating data 228 (where dotted arrows show the progression of the evaluation of the random data) as evaluated in relation to the benchmark, and typically each expert J. The evaluated random rating data is processed through step 216 to generate reliability metrics 220 based on the random rating data. The evaluated random rating data is also processed through step 222 to generate validity metrics 224 based on the random rating data.

As described above, typically, the metric generation step 172 is preformed for each expert J for evaluation with each rater K. The reliability metrics 220 of the collected data (and the random rating data if available) as well as the validity metrics 224 of the collected data (and the random rating data if available) are forwarded as metric output 174 to the condensation step 180 (see FIG. 2).

In one embodiment, the present methods and systems determine rater reliability. The present invention takes input from various raters or investigators each scoring or rating a population of subjects or objects (e.g., patients, cars, customers, performances and the like), for example by recording observations based on a survey of questions. Further, the present invention determines each rater's ability to accurately categorize each object. If rater's measurements are defined as "true value" plus "error," the following decomposition can be defined:

Datum=True Value+Error

Error=Rater Error+Inherent Error

The measure is decomposed additively for mathematical convenience. The Datum is the value that the rater records, and True Value is the accurate or perfect, objective classification of the object. But misclassification typically occurs through two sources: Rater Error and Inherent Error. The latter is constituted of that variability which cannot be removed (it is an inherent limitation(s)); for example, purposeful deception by the subject or object, or a patient's mood may result in misclassification, and it is difficult to compensate for this variability. However, in one embodiment, the present invention provides weighting compensation to at least partially address this issue. The former type of error is due to the inconsistency or inexperience of the rater, which may for example arise from lack of proficiency in the particular classification task. The present method and system provide for diagnosing Rater Error and measuring the significance of the diagnostics.

Previous reliability theories, for example inter-rater reliability theory, attempt to ascertain the correlation between the raters. If several raters examined the same object, the correlation statistics would give a measure of consensus among raters. Chronbach's Alpha theory measures the reliability of the test itself. However, an inter-rater approach fails to measure raters against an absolute standard; it merely differentiates between peers, and thus perpetuates any mediocrity inherent in the body. The inter-rater approach only addresses reliability and not validity. Measuring rater's against a consensus opinion fails to provide a useful purpose for highly accurate and critical fields, such as an elitist science, wherein most raters are incorrect and only a few come near the answer. Alternatively, the present invention provides accurate and meaningful diagnostics by utilizing a benchmark of objective validity. A further difficulty in providing meaningful diagnostics of rater data is that typically, each rater measures a different (possibly disjoint) body of objects. This fact necessarily invalidates the use of correlations or other comparative analysis.

An additional well-known statistic in reliability theory is Cohen's Kappa. By measuring degree of agreement of raters over a body of objects, this statistic quantifies concordance. However, the Kappa fails to comment on validity, this is not the function of the Kappa measure.

As discussed above, the present invention utilizes a benchmark to establish a defined true or accurate result or rating. In one embodiment, the existence of a body of expert raters is used to establish the benchmark, where a rating for each object to be rated is distilled from at least one of the expert raters, and taken for truth.

With the defined benchmark, the present invention constructs metrics, which calculate a statistical distance between the profile of each rater and the profile of the benchmark. These metrics pick out various characteristics of a rater profile to allow an assessment of the rater and determine the rater's reliability and variance.

The present invention provides a diagnosis of rater inconsistency and provides meaningful interpretations of the resulting metrics and measures. The Pearson Correlation Coefficients provides a classical measure of correlation for bivariate data used in statistics that yields a number between −1 and 1, with 1 indicating full positive correlation, −1 full negative correlation, and 0 the absence of correlation. However, this correlation fails to provide a measure of significance for a calculated correlation coefficient (i.e., a value of 0.237 provides what significance; is it large enough to indicate a significant positively correlated relationship?). One and perhaps the best attempt at providing significances, is to square the coefficient, and assume a linear regression model, then 5.6% of the dependent variable is explained by the independent variable. This remains a mysterious value, and suffers from the same difficulty of significance interpretation. However, the present invention provides various interpretative schemes to evaluate the significance of metrics generated based, at least in part, on the distance measure between the rater and the benchmark.

In one implementation of the present invention, data is compiled from a population of raters A rating one or more objects of a population of objects B. For example, the raters can evaluate the object(s) by answering a plurality of test questions Q. In practical applications of such tests, a problem arises in that rater $K \in A$ evaluates a proper subset of B, and another rater $K' \in A$ evaluates a separate subset of B. There may be little or no overlap between the body of objects rated by K and K'. It can be expected that the intersection of all rated object groups across the pool of raters is empty in general, so there is no possibility of taking a common set of objects. The present invention provides compensation for this format, although the validity of the results obtained through the present method and system increases when the object population B is common to a plurality or all raters.

To simplify the description of the present methods and systems, it is assumed that each rater operates independently of the others, and each object is independent of the other objects, however, this is not a requirement for accurate implementation and operation of the present invention. Alternatively, the present description does not assume the object population is stationary, distributionally speaking. Whereas B represents a slice of a larger population, which is selected more or less at random, and thus it exhibits a spectrum of behavior, the difficulty lies in the ease of diagnosis or rating. One object $\beta$ may be intrinsically harder to categorize than another object $\beta'$, even if their True Ratings are identical. The present invention additionally measures an object's (e.g., a patient's) obtuseness, and incorporates this obtuseness or difficulty of rating into a rater metric.

The reliability of a measurement system refers to its consistency, either considered internally or temporally. Internal reliability can be conceived of as coherence; when considering various measurement devices within the measurement system, there is a strong predictability (relationship) between the components. Temporal reliability refers to stability, the consistency of the measurement devices across time and repetition. Conceiving of temporal reliability diagnostics as time series data, stability can be equated with high short-lag autocorrelation statistics. Seen from a statistical perspective, the comparison of measurement devices possesses low variability or dispersion; seen in terms of information, low measures of entropy imply a high order and structure to the interrelationship of measurement components. These soft definitions and notions are formulated with greater precision below.

As for validity, the present invention determines accuracy in addition to precision. Typically, validity implies reliability, but not conversely. In addition to low dispersion, that the present invention determines whether the bias (or centering) of the measurement system versus some objective benchmark is small. Low entropy is typically not enough to designate validity, but a determination that the type of structure is correct is usually employed.

The present invention provides a measurement system and method that evaluates ratings from a panel of raters, and generates components or measurements that refer to a particular rater. Thus coherence can be generally defined as a reliability of one rater versus another, although instead of directly comparing two student raters, which can be easily done with a Kappa calculation, the present invention provides a comparison of each rater to a benchmark, and then compares the rater's respective proximity to that benchmark. Stability generally refers to the long-term performance of a rater.

In one embodiment, a distributional approach is employed to construct profiles of each rater, by comparing a rater's rating to an expert's ratings. These profiles are distributions or vectors, each component of which represents a probability (vectors because the data is categorical). As such, the present invention utilizes distance metrics between distributions, in some space of probability distributions.

Generally, for a fixed rater K and sub-collection of objects B (e.g., patients) that the rater evaluates, the frequency of getting a certain response can be calculated. Collecting these frequencies into a distribution gives an estimate $P_K$ of a rater's profile. This is an approximation of an abstract distribution, which represents the rater's ability to categorize the population. The assumed independence of objects supports the validity of the estimate, but the problem of rater obtuseness is still to be addressed.

As an example, a fix question q may have categories or ratings of 0, 1, 2, . . . , D. These categorical ratings (0, 1, . . . D) are ordinal, such that the set of categories is inherently ordered and relevantly spaced. By ordered, it is meant that the fact that 1 is greater than 0 has real significance in terms of the data, whereas relatively spaced refers to the idea that there is as much discrepancy between 1 and 0 as there is between 2 and 1. $P_K(r)$ is the proportion of objects that rater K assigns a rating r, for r between 0 and D. This is calculated by counting up the number of objects that rater K assigns to rating r, and then dividing this sum by the total number of objects considered. This distribution $P_K$ can then be compared to a similar construct derived from the experts, referred to as P*.

However, the present invention does not implement this comparison directly. By maintaining an order of ratings the present invention provides accurate comparisons with the expert. One drawback of implementing the comparison directly, is that a metric measures whether a rater has the correct proportions. In particular, any permutation of the subject body leaves the profile unchanged, even though this could have significant consequences in terms of rater performance. For example, if there are four objects rated with a question where D=2, and the expert rates the first two of them with a 0, and the second pair with a 2. Thus $P^*(0)=0.5$, $P^*(1)=0$, and $P^*(2)=0.5$. A rater that confutes the pairs, such that the first two are assigned to the rating 2, and the second pair to the rating 0, has committed a serious classification error, nothing could be more erroneous. However, the distribution $P_K$ is identical with $P^*$, and any metric on distributions are unable to distinguish them.

The present invention ensures accurate comparisons by preserving the order of objects and avoiding the problems seen in the previous example. In general, the present method and system match up the rater's classification of an object β with an expert's classification of the same object β. At the same time, the present invention preserves the statistical nature of the comparison method of computing a distribution, because this creates a sensible signature of the rater across a body of objects. In one embodiment, the present invention examines the difference between rater and expert classification for the same object, and collects these data in a distributional format. In one embodiment, the present invention utilizes a more general way of solving this problem by considering the joint distribution $P^\#$ rater and expert.

For example, consider an individual question q with given categories 0, 1, 2, ..., D. Since both the rater K and the expert opinion produce a number in this range, their difference generates a number between −D and D:

$$\text{Rater Value}-\text{Expert Value} \in \{-D, -D+1, \ldots, -1, 1, \ldots, D-1, D\}.$$

A difference distribution is generated (labeled below as P), which consists of the frequency of various differences across the population of objects considered. As such, P(r) represents the proportion of values $r \in \{-D, \ldots, D\}$ encountered. This presents a signature for rater K, which is proof against the permutation defect discussed above. Some of the features of the distribution P include:

1. The expert consensus and rater K should examine the same group of objects. To simplify the description, it is assumed that expert ratings for the entire object population B exist. However, in one embodiment, as described fully below, the present invention can construct a sensible expert opinion that provides a complete evaluation of the object population.

2. The method tacitly assumes that each object presents an equal amount of "obtuseness" (their inherent rating intractability). However, as discussed above, this is not a tenable hypothesis. In one embodiment, the present invention weights certain objects more highly in the calculation of P. The generation and use of weights is described fully below. Generally, weights are applied if the rated object was particularly clear or easy to rate where the errors are amplified in this case, because making a mistake is harder to do. Conversely, weighting is applied when the object is very hard to rate down-weighting their contribution, since a rater should not be penalized as heavily for mistakes with a difficult object. If the rater made a correct evaluation (a difference score of 0), the multiplicative weight factors may be employed so that they have no effect, since multiplication by 0 is still 0.

For example, a rater K rates a body of N objects, which are assigned the numbers $\{1, 2, \ldots, N\}$. The symbol u represents a possible difference of expert and rater ratings, so $u \in \{-D, \ldots, D\}$. A difference in ratings is calculated for each object $i \in \{1, 2, \ldots, N\}$, where that difference rating is denoted by $Z_i$. Hence $Z_i \in \{-D, \ldots, D\}$, and P(r) is just the proportion of $Z_i$'s that are equal to u:

$$P(u) = \frac{1}{N} \sum_{i=1}^{N} 1\{Z_i = u\} \quad (1)$$

Here, $1\{Z_i = u\}$ is a function which returns a value of 1 when $Z_i$ is equal to u, and returns a value of zero otherwise. Equation (1) can be generalized to the following form:

$$P(u) = \sum_{i=1}^{N} w_i 1\{Z_i = u\} \quad (2)$$

The numbers $\{w_1, w_2, \ldots, w_N\}$ are weights, i.e. values between 0 and 1 which add up to one. If each weight is taken to be identically 1/N, then the result is Equation (1), the standard form. Thus, to down-weight a particular object i due to obtuseness, a weight of $w_i < 1/N$ is selected. Conversely, an easily rated object i can be up-weighted by taking $w_i > 1/N$.

3. The independence of objects is also assumed; statistically, this means that the collection of random variables $Y_1, Y_2, Y_N$ are assumed to be probabilistically independent of one another.

4. A perfect score is represented by the distribution P(0)=1. The issue of "degrees of freedom" is now further addressed. Consider two raters, each achieving the perfect distribution P(0)=1, but on different population sizes. The rater getting a perfect score across a larger population has more significance attached to his performance, versus the other. Thus, the sample size N from which P is calculated has some bearing upon the significance of the distribution's proximity to the perfect. The inclusion of sample size in determining significance is described fully below.

The perfect distribution is denoted $\delta_0$, for theoretical reasons. As such, $\delta_0(0)=1$ and $\delta_0(u)=0$ for any value of u that is nonzero.

5. Addressing the issue of consistency of the distribution, each collection of probabilities P represents an estimate, calculated from independent data points $Y_i$. It is asserted that P becomes more accurate as a description of the profile of the rater K as the sample size N approaches infinity. Under some mild conditions on the random variables $Y_1, Y_2, \ldots, Y_N$, a simple theorem grants mean-square consistency. The result of these purely theoretical considerations is that a greater sample size improves the quality of P as rater K's error signature. More detailed distributional calculations are described below.

With these simple observations in hand, appropriate metrics on the space of distributions are utilized as described below.

A metric d on the space of random variables with distributions from the space Π (denoted by R(Π)) is a non-negative function "d" of two variables, symmetric in its arguments, such that d(A,B)=0 if and only if A=B (with probability one), where A and B are any two random variables. In addition, it may be desirable that metrics satisfy the triangle inequality:

$$d(A,Y) \leq d(A,B)+d(B,Y) \quad (3)$$

for any distributions R(Π). One candidate for the metric is:

$$d(A, B) = \sum_{u=-D}^{D} |P(u) - Q(u)|, \quad (4)$$

where A and B have distributions P and Q respectively. The metric defined by Equation (4) is only a metric on the space of distributions Π; it fails to distinguish between A and B completely. Alternatively, the metrics on R(Π) are desired, not on Π. Considering the distance between P, the distribution of errors for rater K, and $\delta_0$ (the perfect error distribution), the following formula can be utilized:

$$d_{MSE}(A, B) = \sqrt{\int\int (b-a)^2 P(db) Q(da)}, \quad (5)$$

where MSE stands for Mean-Squared Error. Equation (5) is the average of the squared difference of two independent random variables A and B with distributions P and Q respectively. Letting P be the rater distribution given by Equation (1) above, and letting $Q=\delta_0$, the following is obtained:

$$\|P\|_{MSE} = d_{MSE}^2(Y, 0) = \frac{1}{N}\sum_{i=1}^{N} Y_i^2. \quad (6)$$

It is typically more convenient to deal with the squared distance, even though this does not satisfy the triangle inequality. Equation (6) is the second sample moment of the data $Y_1, Y_2, \ldots, Y_N$, and is relatively easy to compute. Thus the function $\| \ \|_{MSE}$ is non-negative, and is 0 if and only if $P=\delta_0$, as desired. It is not actually a norm, since it does not satisfy the triangle inequality; but there is an advantage in taking the squared distance, as the second sample moment can then be decomposed into variance (of P) plus the square of the first sample moment (of P), which is the Variance-Squared Bias decomposition of the MSE.

$$\text{Mean}(P) = \int bP(db) = \frac{1}{N}\sum_{i=1}^{N} Y_i, \quad (7)$$

$$\text{Var}(P) = \int (b - \text{Mean}(P))^2 P(db) = \frac{1}{N}\sum_{i=1}^{N} (Y_i - \text{Mean}(P))^2. \quad (8)$$

Thus Equation (6) is equal to Equation (8) plus the square of Equation (7). Observe that Equation (7) is also the Bias of P versus $\delta_0$, i.e., $$\text{Bias}(P, Q) = \int\int (b - a) P(db) Q(da), \quad (9)$$

$$\text{Bias}(P, \delta_0) = \text{Mean}(P) \quad (10)$$

This demonstrates that $\| \ \|_{MSE}$ is a relatively decent measure of separation between P and $\delta_0$, consisting of the variance Var(P), which measures the overall tendency of the rater's errors to fluctuate, and the squared bias Bias(P,$\delta_0$)$^2$, which measures the average separation (in a location-sense) of P and $\delta_0$.

One feature of the distributions that is captured by the present invention is the nature of the errors made. This is done in an average sense. By selecting metrics carefully, measures that are sensitive to a type of error are employed. From a probabilistic standpoint, this amounts to picking off features of the distribution P, such as mean, variance, skewness, and kurtosis.

In general, viewing the P and Q above as marginal distributions of some joint measure R, a norm can be defined on the product space R(Π×Π) as follows:

$$\|f\|_R = \int\int f(a, b) R(da, db). \quad (11)$$

So long as f is a non-negative function of two variables, this "norm" satisfies the property that it is zero if and only if f is zero for substantially every x and y, with respect to R. For R=P×Q and $f(a,b)=(a-b)^2$, this reduces to the square of Equation (5). Likewise, it is apparent that:

$$\|(a-b)^2\|_{P \# } = \|P\|_{MSE} = d_{MSE}^2(Y, 0) \quad (12)$$

using Equation (6). Thus, Equation (11) affords a generalization of the method pursued in Equation (6) and following.

As introduced above, the sample second moment captures generic rater variability, where variability can be considered as two types: (i) consistent variability and (ii) inconsistent variability. The former type refers to pronounced variation from the perfect distribution $\delta_0$, but the errors appear to cluster somewhere, such that the error may be considered directional. In fact, if the center of variation is shifted to the middle of the cluster, the distribution has little variance about the new center. One way of capturing this is through the Bias(P,$\delta_0$) term (which is actually the mean); the sign indicates whether the rater is over-rating or under-rating the objects. As for inconsistent variability, this is a raw measure of spread in all directions. The term Var(P) captures this, since it measures variability from Mean(P), not from the point 0. Thus, the measure $\| \ \|_{MSE}$ incorporates both of these features, since $\|P\|_{MSE}$=Var(P)+Bias(P,$\delta_0$)$^2$. If inconsistent variability is penalized more (or less) than consistent variability, then some $\theta\in[0,1]$ is chosen and the convex combination $\|P\|_{NEW}=\theta\text{Var}(P)+(1-\theta)\text{Bias}(P,\delta_0)^2$ is formed. The resulting measure has the same properties as the original (so the square root of it is a genuine norm on distributions Π).

In generalizing the tools to third and fourth sample moments, a third sample moment is defined as:

$$\varepsilon_{MCE}(P, \delta_0) = \int\int (b - a)^3 P(db)\delta_0(da) = \frac{1}{N}\sum_{i=1}^{N} Y_i^3, \quad (13)$$

which can be positive or negative (and hence is not a metric). The subscript MCE is used to indicate Mean-Cubed Error. Now just as the MSE had a decomposition in terms of the first and second centered moments (which had the interpretations described above), the MCE can be decomposed in terms of the first, second, and third centered moments, which are the mean, variance, and skewness respectively. The skewness is defined as:

$$\text{Skew}(P) = \int (b - \text{Mean}(P))^3 P(db) = \frac{1}{N}\sum_{i=1}^{N} (Y_i - \text{Mean}(P))^3. \quad (14)$$

Now a standard calculation produces:

$$\epsilon_{MCE}(P,\delta_0) = \text{Skew}(P) + 3\text{Mean}(P)*\text{Var}(P) + \text{Mean}(P)^3 \quad (15)$$

The fourth moment can be computed as follows:

$$\varepsilon_{MCE}(P, \delta_0) = \int\int (b-a)^4 P(db)\delta_0(da) = \frac{1}{N}\sum_{i=1}^{N} Y_i^4, \quad (16)$$

which is a metric if the fourth root is taken. The subscript MFE stands for Mean-Fourth Error. Although complicated, the MFE can be decomposed in terms of centered moments as well; the fourth centered moment is referred to as the kurtosis, and is defined as:

$$\text{Kurt}(P) = \int (b - \text{Mean}(P))^4 P(db) = \frac{1}{N}\sum_{i=1}^{N} (Y_i - \text{Mean}(P))^4. \quad (17)$$

A short calculation yields:

$$\epsilon_{MFE}(P,\delta_0) = \text{Kurt}(P) + 4\text{Mean}(P)*\text{Skew}(P) + 6\text{Mean}(P)^2*\text{Var}(P) + \text{Mean}(P)^4 \quad (18)$$

The skewness parameter measures the degree to which the distribution is asymmetric, whereas the kurtosis measures the decay of the tails of the distribution, i.e., high kurtosis indicates that extreme values are more common as compared with the mean, further indicating a that the distribution has higher entropy.

The previous discussion and provided measures deal with the application of a single question possessed by the rating scale (measurement device). The concatenation of the error measures for each question into one total measure is next addressed. A subscript "t" is placed on the error measure to designate the "t"th question in a rating (such as an exam of a patient) with k questions. The number of possible responses D to a question t is allowed to depend on t; in fact, the measures Pt may be quite different and need not be independent. Letting $P_g$ denote the joint distribution over g vectors, and $\delta_0$ is the distribution that assigns probability one to the g-vector consisting of all zeroes. Then the MSE can be defined as follows:

$$\|P_g\|_{MSE} = d^2_{MSE}(P_g, \delta_0) = \int\int |b-a|^2 P_g(db)\delta_0(da). \quad (19)$$

The above equation consists of 2 g integrals, since b and a are g-component vectors. The absolute value bars denote vector length. As such, Equation (19) can be simplified to:

$$\int \sum_{i=1}^{g} b_i^2 P_g(db) = \sum_{i=1}^{g} \int b_i^2 P_g(db) \quad (20)$$

$$= \sum_{i=1}^{g} \int b_i^2 P_i(db_i)$$

$$= \sum_{i=1}^{g} \|P_i\|_{MSE},$$

after using some integration arguments. This provides justification for summing the MSE's for each question, even though the measures $P_t$ may not be independent.

An alternative method can make the whole analysis multivariate. The objective is to calculate the joint error measure $P_g$ from the beginning, instead of calculating the marginal distributions $P_t$. This can be more computationally complicated, and for the measure $\|P_g\|_{MSE}$ introduced in Equation (19), the same results are obtained (Equation (20) shows that the value only depends on the marginal distributions of $P_g$).

As discussed above, the generation of a benchmark is accomplished through the ratings of a body of experts. The body of experts is sufficiently large to rate every object on every question maintained by the measurement device. This completeness property allows for the rater classifications later.

In one embodiment, once the experts have been determined, and an expert rating is obtained for each question and each object, the mode value (the most frequent) for each question and object is recorded as the expert rating for that question and object. The choice to use the mode is for several reasons: the mode measures the center of the experts' answers, such as the mean, median, or mode; since the data is categorical, the mean is not used (the result might not be an integer). If the sample size of experts is even, the median can also suffer from this defect. The mode is guaranteed to be an integer; and the mode is the most frequent rating that was given. If the experts really possess expertise, they tend to concur more often then neophytes would (there is less room for variability as you move closer to the truth, generally speaking). Thus, the mode is expected to be a majority of the responses, rather than just a plurality.

In one embodiment, this mode value is recorded as the expert rating for that question and object. It can then be compared to each rater's classification, for that same question and object.

If the experts vary a good deal from the mode, then it may be deduced that the particular object is obtuse, or hard to measure. Consequently, it may be desirable to down-weight that object's importance in the calculation of the distribution P. Conversely, if there is no variation in expert opinion, it may be desirable to up-weigh the object.

In one embodiment, the Kappa coefficients are used to test expert reliability. The reasoning is that reliability implies validity (which is not usually true), since the experts are expected to be accurate and precise on average, their consensus (mean, mode or other measure) can actually be taken as the determinant of truth, when the task is viewed from an elitist perspective.

Determining the meaning of the constructed measures allows for the determination of significance with regards to each rater relative to the experts (and in some respects relative to other raters). The raters are evaluated against the objective benchmark, and in some embodiments the raters' performance is compared against that objective standard with other raters. If the MSE measurements are collected and ranked, a distributional look at the population A of raters is provided.

It is assumed that each $P_K$ (the distribution for the rater K, where this is the distribution for the entire test, as such, the collection of g marginal distributions for each question) is a sample from some super-distribution $\mu$. That is, $\{P_K, K \in A\}$ is a random sample from some distribution $\mu$. If the distribution $\mu$ is known, the distribution of $\|\mu\|_{MSE}$ can in theory be calculated, and thereby measure the significance of $\|P_K\|_{MSE}$. To be more precise, let G be a random variable with absolutely continuous distribution $\mu$, whose values are distributions of differences across an entire exam. Then a cumulative distribution function can be given by:

$$\Omega(a) = Prob[\|G\|_{MSE} \leq a] \tag{21}$$

Now calculating the quantiles of $\Omega( )$ provides a distributional significance for the values of $\|P_K\|_{MSE}$; in fact, $\Omega^{-1}(\|P_K\|_{MSE})$ gives the probability p that $\|G\|_{MSE}$ is less than $\|P_K\|_{MSE}$. This theory allows for the ranking of raters. However, the calculation of $\Omega$ is not transparent. It can be estimated empirically, by forming the empirical distribution function of the values $\|P_K\|_{MSE}$.

In one embodiment, this problem is addressed with a Bayesian approach, one postulates a prior distribution for $\Omega(a)$, and uses the data to update this picture. In one embodiment, a bootstrap or other nonparametric techniques are employed on the values $\|P_K\|_{MSE}$ to produce a better estimate of $\Omega(a)$.

If the joint measure $P^{\#}$ of rater and expert (or any two raters) is examined, a coefficient of disagreement $q_0$ can be calculated, which is equal to the probability that the rater and expert disagree on a classification. Formulaically, this can be defined as:

$$q_0 = \iint_{a \neq b} P^{\#}(da, db). \tag{22}$$

Cohen's Kappa is a comparison of $q_0$ to $q_c$, the probability of disagreement due to chance alone, resulting in:

$$q_c = \iint_{a \neq b} P(da)Q(db), \tag{23}$$

where P is the marginal distribution of $P^{\#}$ with respect to the rater, and Q is the marginal distribution of $P^{\#}$ with respect to the expert. Needless to stay, under probabilistic independence of the measures, $P^{\#} = P \otimes Q$ and $q_0 = q_c$. Cohen's Kappa is defined under dependency as:

$$\kappa = 1 - \frac{q_0}{q_c}. \tag{24}$$

If the disagreement is to be down-weighted, a weight function f is considered that assigns a certain number $f(a,b)$ to the categorization $(a,b)$; the student assigning the object to category a, and the expert assigning them to b. Typically, $f(a,b)=0$, since the diagonal constitutes complete agreement between student and expert, and therefore no penalty should be assigned. Thus weight q values are obtained through:

$$\tilde{q}_0 = \iint f(a,b) P^{\#}(da, db), \text{ and} \tag{25}$$

$$\tilde{q}_c = \iint f(a,b) P(da) Q(db). \tag{26}$$

Corresponding to this is the weighted kappa, given by:

$$\kappa_f = 1 - \frac{\tilde{q}_0}{\tilde{q}_c}. \tag{27}$$

If the computed measure $P^{\#}$ is viewed as an estimate of some true joint measure, then the weighted Kappa is an estimate of a true Kappa coefficient (under the hypothesis that the marginal distributions are non-random), and asymptotic normality can be established (as the number of objects N approaches infinity) of the estimate.

Observe that Toeplitz-type weights, those of the form $f(a,b) = h(a-b)$ for some one-variable weight function h, are appropriate for reliability problems involving highly ordinal data. This is because the order of the categories holds significance, and the discrepancies between categories are equally serious. Note that for real Toeplitz weights, $f(a,b) = h(|a-b|)$, which provide that not only are the weights constant along diagonals of the matrix $\{0, \ldots, D\} \times \{0, \ldots, D\}$, but they are symmetric as well. Since the problem at hand is not symmetric with respect to a rater (i.e., the rater and the expert are to be distinguished), it may be advantageous to allow for the more general Toeplitz-type weights. For the choice of weight function $f(a,b) = (a-b)^2$, the MSE measurement is equal to $\tilde{q}_0$, where:

$$\tilde{q}_0 = \iint (a-b)^2 P^{\#}(da, db) = \|(a-b)^2\|_{P^{\#}} = \|P\|_{MSE}. \tag{28}$$

As a consequence, there is a close connection to the weighted Kappa and the calculated MSE measure. Generalizations to other penalty functions f to determine various different norms $\|f\|_{P^{\#}}$ correspond to choices of weight functions f in $\kappa_f$. As noted by Cohen, when $P = Q$ and $f(a,b) = (a-b)^2$, the weighted Kappa is precisely the Pearson correlation of $P^{\#}$. More generally, calculations produce:

$$\kappa_{(a-b)^2} = \frac{2 Cov_{P^{\#}}(A, B)}{Var_P(A) + Var_Q(B) + (E_P A - E_Q B)^2}, \tag{29}$$

where $E_P A$ denotes the average value of a with respect to the measure P.

This connection with Kappa coefficients lends additional support to the method, as it is embedded within a more general theory for nominal/ordinal data. The differences between Kappa and the method described become salient when considered with the highly ordinal nature of the data accrued from implementations of such objective measurement techniques, and the assumption of an expert benchmark for validity determination.

Some of the "large-sample" properties of the MSE measure are now discussed and a "true" MSE is distinguished from its estimate. Letting $P^{\#}$ denote the joint measure of rater and expert, and $\hat{P}^{\#}$ its sample estimate, then $\hat{P}^{\#}$ can be calculated by:

$$\hat{P}^{\#}(a, b) = \frac{1}{N} \sum_{u=1}^{N} 1\{A_u = a, B_u = b\}, \tag{30}$$

where $A_u$ denotes the category (i.e., a rating value, "0, 1, 2, ... D", and such) assigned by the rater to the $u^{th}$ object, and $B_u$ is the category assigned by the expert rater to the $u^{th}$ object. Hence the estimated MSE is equal to the expectation of the function $f(a,b) = (a-b)^2$ under the measure $\hat{P}^{\#}$, where:

$$\|\hat{P}^{\#}\|_{MSE} = \int\int (a-b)^2 \hat{P}^{\#}(da, db) \quad (31)$$

$$= \frac{1}{N}\sum_{u=1}^{N} f(A_u, B_u)$$

$$= \frac{1}{N}\sum_{u=1}^{N} (A_u - B_u)^2$$

From this, calculations yield the mean of $\|\hat{P}^{\#}\|_{MSE}$ to be $\|P^{\#}\|_{MSE}$, and the variance is equal to:

$$\frac{1}{N}\left(\int\int (f(a,b))^2 P^{\#}(da, db) - \left(\int\int f(a,b) P^{\#}(da, db)\right)^2\right) = \quad (32)$$

$$\frac{1}{N}\left(\int\int (a-b)^4 P^{\#}(da, db) - \|P^{\#}\|_{MSE}^2\right)$$

It is noted that the MFE minus the square of the MSE constitutes the variance of each independent summand. Maintaining the assumption that objects are independent and generally distributed, the estimate $\|\hat{P}^{\#}\|_{MSE}$ is approximately normally distributed, with mean $\|P^{\#}\|_{MSE}$ and variance given by Equation (32). Moreover, the normal approximation is valid if Equation (32) is replaced by the sample variance, such that:

$$\frac{1}{N}\left(\int\int (a-b)^4 \hat{P}^{\#}(da, db) - \|\hat{P}^{\#}\|_{MSE}^2\right). \quad (33)$$

This approximation is typically more effectively applied when N>30.

One application of these asymptotics is to form confidence intervals for a point estimate of MSE. Additionally, hypothesis tests can be performed (against a Null that the true MSE is zero, for example). In one embodiment, the present method and system additionally uses "degrees of freedom" in assessing raters. For example, if two raters get an equal MSE estimate (e.g., the values are actually zero), but one was computed over twice the sample size of the other, the important comparison to be made lies now in the variance of their MSE score, which is estimated by Equation (33). The lower variance is a more desirable result since it indicates lower entropy within the distributional fluctuation of MSE scores. The present methods and systems are not limited to the theories described, other theories and methods can be employed to obtain the same or similar results without departing from the novel aspects of the present invention, such as utilizing a Gaussian theory, using an information criterion that takes into account the mean and variance of the MSE score along with the degrees of freedom, as well as other theories.

The following provides definitions of reliability and validity according to one embodiment of the present invention. A rater is said to be reliable if the Variance portion of the rater's MSE score is low (they are fully reliable if it is zero), and because the MSE is calculated against an expert benchmark, it is more precise to define the rater as reliable with respect to the benchmark. A rater is said to be validated or that the rater's judgments are valid if the rater's MSE score is low.

Letting X and Z denote the judgments of a rater and an expert respectively, with distributions P and P*. The MSE is the expected value (with respect to the joint distribution $P^{\#}$) of $(X-Z)^2$, and when decomposed into Variance and Squared Bias, the Variance term can be calculated as:

$$Var(X-Z) = Var(X) + Var(Z) - 2Cov(X, Z) \quad (34)$$

and the Squared Bias can be calculated as:

$$(E[X-Z])^2 = (EX)^2 + (EZ)^2 - 2EX \cdot EZ \quad (35)$$

It can be seen that the term $\tilde{q}_c$ is equal to the Var(X) and Var(Z) terms of Equation (34) added to Equation (35). This makes some sense, since a low value of $\tilde{q}_c$ should not imply reliability.

In determining reliability if Var(X−Z) is zero, then X−Z is a constant, such that Z=X+c for some constant c. As such, it can be seen that ratings or judgments X and Z are related by a shift c, and the dependence is full (in this example, the Squared Bias term is $c^2$). In an ordinal data setting, this is the notion of coherence (since X and Z represent two distinct measurement components of the system). Typically, if X and Z are ratings made by the same component at past and future times the notion of stability results. The converse also holds that if X−Z is constant, then Var(X−Z) is zero.

This focuses on full reliability. However, when Var(X−Z) is low, but is not zero (which is expected to be the majority of cases), reliability in a regression paradigm can be written as:

$$Z = \beta X + c + e \quad (36)$$

where β is some sort of scaling of the rating X, c is a constant shift, and e represents some additional random error (typically independent of X). It is noted that it may appear to make more sense, intuitively, to predict non-expert from expert rating (which may be thought of as being a design point for the regression study), which would make Z the non-expert and X the expert. However, the notations of Z for the expert and X for non-expert are maintained.

Full reliability occurs when e=0. The error e might be modeled as some mean zero random variable with low variance (typically it is assumed to be Gaussian, but this may have limited applications for discrete data). However, good reliability, in this context, is equivalent to low variance of e. Further, Var(e)=Var(Z−βX−c)=Var(Z−βX). For ordinal data, β=1 or −1 is the sensible value, since a non-integer value would mean that Z is non-categorical, and a number greater than one in magnitude would force Z to skip values. Finally, β=−1 is typically excluded because the categories are assumed to be of the form {0,1, . . . , D}. Hence β=1, resulting in Var(e)=Var(Z−X)=Var(X−Z). Thus, low variance of the error corresponds to low variance of the difference in scores justifying the definition of reliability.

In some implementation of the present invention, variance is interpreted as precision, and bias as accuracy. If Equation (36) above is applied, then the Squared Bias is equal to $c^2$. It follows that low Bias can imply accuracy.

Additionally, letting the whole MSE score measure validity, and from Equation (36), zero MSE implies zero Variance and zero Bias, which in turn implies that Var(e)=0 and that c=0. However, then e=0 with probability one, and Z=X almost surely. This can be defined as total validity of X with respect to the benchmark Z. When the MSE is low, then Z is approximately equal to X with high probability, which is near validity, and essentially, Var(e) and |c| metrize validity.

Further, validity typically implies reliability, but not conversely, which can be shown by the decomposition of the MSE as Variance plus Squared Bias. If the rater is fully validated, the MSE=0, and hence Variance=0, and thus they are fully reliable. Conversely, it is possible to have zero Variance and non-zero Bias, and from this obtain a non-zero MSE score.

One example of a subjective measurement technique is the Hamilton Depression Rating Scale (HAMD). The HAMD is a diagnostic rating scale used by clinicians to detect and measure the symptom attributes of Major Depressive Disorder (MDD) in patient subjects. It is administered to a patient subject in the form of an interview. The HAMD scale is typically composed of 17 individual "items" which address different attributes of the disease. Each item is composed of a structured subset of questions that are gauged to query a component of MDD. For example, the "Depressed Mood" item of the HAMD uses a question set similar to the following question to query specific properties of the subject's mood, What's your mood been like this past week (compared to when you feel OK)?

Have you been feeling down or depressed? Sad? Hopeless? Helpless? Worthless?

In the last week, how often have you felt (own equivalent)? Every day? All day?

Have you been crying at all?

Each item also maintains an ordinal scale that the rater uses to assign a score (i.e. a "rating") that corresponds to the level of severity or penetration of the addressed symptom, as it is interpreted (by the rater) from the patient's response to the query. The scoring scale implemented for the Depressed Mood item of the HAMD is constructed as follows: (0) Absent; (1) These feeling states indicated only on questioning; (2) These feeling states spontaneously reported verbally; (3) Communicates feeling states non-verbally, i.e. through facial expression, posture, voice, and tendency to weep; and (4) Patient reports VIRTUALLY ONLY these feeling states in his spontaneous verbal and non-verbal communication.

In an ideal world, it is the duty of the conventions which govern appropriate administration of the HAMD and its diagnostic components to restrict the scope of the rater's subjective interpretation of patient responses to each query. In the above example, the HAMD conventions dictate exactly how the rater would use their observation of the patient subject's response to construct the basis in which to select and assign a score value of 0, 1, 2, 3, or 4, consequently measuring the degree of Depressed Mood in that patient subjectively.

However, in reality it has been widely demonstrated that the HAMD, in addition to a large number of other subjective measurement techniques, is inherently vulnerable to environmental artifacts associated with the measurement process produced primarily by (but not limited to) inconsistency of interview implementation by the rater, as well as by the inconsistency in responses from the subject being measured.

The present invention provides a diagnostic architecture to carry out performance assessments that address issues of reliability and validity concerning the collected data, as well as the implementation practice of individuals who administer subjective measurement techniques to subject matter (e.g., as the rater administering the HAMD rating scale to the patient subject in the previous example). The present invention takes advantage of the diagnostic methods and techniques and provides an educational method and system for training raters and potentialraters.

The overall educational process makes use of this analytical evaluation of collected data and provides the architecture in which to construct and control an environment that permits individuals to implement subjective measuring techniques to subject matter, and the details of their resulting performance to be observed, accrued and organized for analytical processing. The analysis and evaluation of the collected data performed by the present invention includes reliability and validity assessments of individual performance that are then available to be communicated in the form of literary documentation, and can also be used as input into the training process of the present invention. In one embodiment, the assessments of individual performances can be used to modify the training algorithm in a manner that accommodates perceived strengths and weaknesses of the assessed individual with respect to the individual's implementation of the monitored measurement technique.

As discussed above, some rater variability is due to inherent difficulty in rating and/or judging a particular object. This difficulty may be due to any number of causes, including emotional fluctuations or erratic behavior of an individual being questioned and rated, and may be independent of the object's actual rating. If object A is easy to rate, but object B is quite difficult, then making errors in the categorization of object B is, in some embodiment of the present invention, penalized less severely than errors of similar magnitude made when categorizing object A. In some embodiment, the present invention utilizes a theory for measuring the erraticity (denoting the state of being difficult to rate or judge) of an object, and uses this characteristic to down-weigh and/or up-weight rater reliability/validity measures.

In one embodiment, the benchmark, typically generated through a panel of experts defining a measure of truth and validity, is utilized in measuring erraticity by examining the deviance within the benchmark (within the panel of truth). If every expert rates a given object identically, then the inherent erraticity is quite low. Conversely, if the experts rate an object with different values, this indicates that the object is unusually difficult to judge.

With these heuristics, the defined measures of expert non-consensus are addressed. The DOMENIC method (of Ciechetti et al., Psychiatry Research 72, pg. 51–63, 1997) handles "measures of agreement" for multiple judges of a single object. A coefficient is produced, which gives an average level of inter-rater agreement. While this has some potential as an erraticity measure, there are some reasons against employing the DOMENIC measure.

Because the present invention is concerned with a measure that takes into account multiplicities of the data, the DOMENIC measures is inappropriate; it looks at the data values themselves, measuring the discrepancy of the numbers. However, the present invention weighs equally those objects who gave rise to expert disagreement, irrespective of the directionality of that disorganization. Put another way, erraticity is invariant with respect to a permutation of the expert probability distribution.

For example, consider a panel of four experts who rate object A with ratings {0, 0, 2, 1}, and the same four experts rate object B with ratings {2, 1, 1, 0} (where it is assumed that the possible ratings or categories are 0, 1, or 2. The order of the numbers is unimportant, because, in some embodiment, the present invention assumes a tacit iid on the expert panel.

Letting Q denote the probability measure for the experts; $Q_A$ is the measure for object A, and $Q_B$ is the measure for object B. Then the estimated probabilities are:

$Q_A(0)=\frac{1}{2}, Q_A(1)=\frac{1}{4}, Q_A(2)=\frac{1}{4}$, $Q_B(0)=\frac{1}{4}, Q_A(1)=\frac{1}{2}, Q_A(2)=\frac{1}{4}$.

The DOMENIC measure can be computed for each object (see Cicchetti et al.) where:

$$DOMENIC_A = 5/12, DOMENIC_B = 1/2.$$

However, $Q_A$ and $Q_B$ are typically not distinguished for the purpose of erraticity evaluation. In determining the erraticity, it is irrelevant that there were two size 2 discrepancies for object A whereas there was only one size 2 discrepancy for object B. Erraticity depends in part on how many repetitions of the various categories occurred. As can be seen, for both objects, one category was listed twice (category 0 and 1, respectively for objects A and B), and the other two categories were each listed once. As such, the erraticity measure for $Q_A$ and $Q_B$ are the same.

To formulate this idea more mathematically, some erraticity measure $\epsilon$ as a function of $Q$ is considered, which, for example, gives a large (real) number for high erraticity, and zero for the complete absence of erraticity. In some embodiment, $\epsilon s(Q)=0$ if $Q=\epsilon_x$ for some $x$, (for example, the experts all rated the object the same). As such, the erraticity can have the following symmetry property:

$$\epsilon(\sigma Q) = \epsilon(Q),$$

for any permutation $\sigma$ operating on the measure $Q$. If the range space of the random variable with distribution $Q$ is the set of categories $\{0, 1, D\}$, then $\sigma$ is an element of the permutation group on $D+1$ elements, and:

$$(\sigma Q)(x) := Q(\sigma x).$$

In the above example, $D=2$, and the permutation $\sigma$ on the symbols $\{0, 1, 2\}$ could be (in transposition notation) $\sigma=(120)$. In this case, $\sigma Q_A = Q_B$. An erraticity measure is sought such that $\delta(\sigma Q_A) = \epsilon(Q_B)$ for any permutation $\sigma$. In one embodiment, the present invention employs entropy to aid in defining erraticity because it satisfies the above requirements. However, other possible erraticity measures could be utilized which include the variance of $Q$, or a modal measure such as:

$$\max_x Q(x) - 1/(D+1),$$

where $D+1$ is the number of categories. The present invention typically allows for the administrator of the implementation of the present invention to select a desired erraticity measure. Below, the erraticity is defined by entropy, because of its good properties. However, the present invention is not limited to entropy as a measure of erraticity.

The Shannon Entropy of a measure $Q$ is defined as:

$$H_Q := -\sum_{s=0}^{D} \log(Q(s)) \cdot Q(s),$$

where log denotes the natural logarithm (the base typically does not matter, because the weights that are defined below are mathematically independent of choice of base). The minus sign offsets the negativity of log $Q(\cdot)$. The entropy is a well-known mathematical object, so the salient properties are lightly passed over, where:

For discrete distributions, the maximal value of $H_Q$ is achieved when $Q$ is the uniform distribution, in which case the entropy is equal to $\log(D+1)$.

The entropy is zero if and only if $Q=\delta_x$ for some $x \in \{0, 1, D\}$. This is the maximally ordered state, corresponding to total expert agreement.

A quick calculation gives $H_{\sigma Q} = H_Q$ for any permutation $\sigma$.

If $Q(s)=0$, it can be defined that $\log(Q(s))Q(s)=0$ by interpreting it as the limit of $x \log(x)$ as $x$ tends to zero from the right.

Due to the above properties, some embodiments of the present invention use entropy as an erraticity measure, i.e. $\epsilon = H$.

In some embodiments, to compensate for erraticity, weights are used to up-weight and/or down weight rater's errors relative to the benchmark. Below are described two types of weights, used in some implementations of the present invention for calculating an erraticity-corrected MSE score. It is assumed there are m experts, indexed by j and N objects, indexed by i. Typically, weights $w_{ij}$ are constructed which have the following properties:

$w_{ij}$ is a real number between 0 and 1. It represents the erraticity weight of object i, according to the jth expert;

$$\text{For each } j, \sum_{i=1}^{N} w_{ij} = 1; \text{ and}$$

The weight $w_{ij}$ should have a low value when the ith object was particularly erratic, and a high value for low erraticity.

It will be apparent to those skilled in the art that alternate properties can be used to construct the weights and other properties can be included in constructing the weights without departing from the inventive aspects of the present invention.

Note that in general, it cannot be assumed that expert j rates all of the N objects that a rater has rated. Letting $X_i$ denote the rating of a rater for object i, and let $Z_{ij}$ denote the rating of the jth expert to object i, then the MSE measure for the rater versus the jth expert is defined to be:

$$MSE_j = \sum_{i=1}^{N} (X_i - Z_{ij})^2 w_{ij}. \tag{37}$$

Further, it is defined that $w_{ij}=0$ whenever $Z_{ij}$ does not exist or is not calculated (as is described fully below).

Two types of weights are defined below, the Single Disagreement weights and the Maximum Disagreement weights, where the Maximum Disagreement weight is typically the preferred weight. However, these two weights are only two examples of a diverse collection of possible weights. In general, each individual or entity implementing the present invention can select weights according to preference and the signature of the data. For each particular choice of weights that is fixed upon, the resulting measurements and significance assessment for that rater retains its objective value, since the significance is computed with respect to the same choice of weights in the metric.

In practice the erraticity measure is typically inverted, since high erraticity corresponds to low weights, and low erraticity corresponds to high weights, when up or down-weighting a rater's errors due to erraticity. If the objects are indexed by i, then entropy (H) can be defined as:

$$H_i := H_{Q_i},$$

where $Q_i$ is the expert distribution for the ith object. Further, the total entropy can be defined as:

$$\overline{H} = \sum_{i=1}^{N} H_i,$$

over the various objects. As such, unnormalized weights (or "pre-weights") $v_{ij}$ for object i and expert j are defined as:

$$v_{ij}=1-(H_i/\overline{H}),$$

so long as $Z_{ij}$ exists; otherwise $v_{ij}=0$. The Single Disagreement weights are obtained by a standard normalization:

$$w_{ij} = \frac{v_{ij}}{\sum_{l=1}^{N} v_{lj}}$$

It is noted that this definition is not well-defined if the total entropy is zero. In that case, it is assumed that all the $w_{ij}=1/N_j$, where $N_j$ is the number of cases rated by the jth expert, and the former MSE is obtained. It is observed that the weights are bona fide weights, as entropy is a positive function (ensuring that $v_{ij} \geq 0$), and high entropy gives a low weight. Further, $w_{ij}=0$ if and only if $v_{ij}=0$ (assuming that $Z_{ij}$ exists), which occurs if:

$$H_i = \overline{H},$$

which is true if $H_j=0$ for all j ≠ i. In other words, all of the expert discrepancy comes from a single object i, and they agree completely on every other object, hence the name "Single Disagreement" weights. In the other extreme, if $H_i=H_j$ for all i and j, $$v_{ij}=1-1/N,$$

(when $Z_{ij}$ exists, and 0 otherwise) and, $$\sum_{l=1}^{N} v_{lj} = N_j - \frac{N_j}{N},$$

so that $w_{ij}=1/N_j$, and the usual unweighted MSE is recovered. Another feature of these weights, is that if $H_i=0$, then $v_{ij}=1$, and $$w_{ij} = \frac{1}{N_j - \frac{\sum_{l \ni Z_{lj}} H_l}{\overline{H}}},$$

where $\Sigma_{l \ni Z_{lj}}$ denotes the summation over all indices l such that $Z_{lj}$ exists. If all the $Z_{ij}$ exist, then $w_{ij}=1/(N-1)$. This can be interpreted as follows: if object i is completely unerratic, weigh MSE discrepancies by 1/(N−1) instead of 1/N (i.e., increase slightly the seriousness of an error), and split the remaining weights among the N−1 remaining objects.

Again, in one embodiment, the erraticity measure is inverted because log(D+1) is a maximal value for the entropy, and preweights $v_{ij}$ for the ith object and the jth expert can be defined by:

$$v_{ij}=\log(D+1)-H_i,$$

so long as $Z_{ij}$ exists, and 0 otherwise. The preweights are then normalized by the sum resulting in the weights:

$$w_{ij} = \sum_{l=1}^{N} v_{lj},$$

which can also be written:

$$w_{ij} = \frac{\log(D+1) - H_i}{N_j \log(D+1) - \sum_{l \ni Z_{lj}} H_l}.$$

Special cases (such as when $\overline{H}=0$) can be dealt with as described above for the Single Disagreement weights. It is observed that $w_{ij}=0$ if and only if $H_i=\log(D+1)$ or $Z_{ij}$ does not exist. The former condition indicates that the erraticity of object i is maximal. In fact, the experts were uniformly distributed over the categories in their ratings of object i (thus the name Maximal Disagreement weights). Additionally, if all the entropies are the same and all the $Z_{ij}$ exist, then $w_{ij}=1/N$.

If $H_i=0$, then the weights can be defined as:

$$w_{ij} = \frac{1}{N_j - \left(\sum_{l \ni Z_{lj}} H_l\right) / \log(D+1)}.$$

If $H_i=\overline{H}$ and all the $Z_{ij}$ exist, then the weights can be defined as:

$$w_{ij} = \frac{\log(D+1) - \overline{H}}{N \log(D+1) - \overline{H}}.$$

For both Single Disagreement and Maximum Disagreement types of weights, it is observed that taking a quotient of entropies cancels out base changes made in the logarithm. Therefore, the weights give the same value, regardless of the base choose for the logarithm.

Utilizing the formula for MSE versus the jth expert, MSE can be defined as:

$$MSE_j = \sum_{i=1}^{N} (X_i - Z_{ij})^2 w_{ij},$$

and averaging over the corpus of m experts, results in an average MSE defined by:

$$\overline{MSE} = \frac{1}{m} \sum_{j=1}^{m} MSE_j.$$

It is further observed that a minimal value for the generalized MSE can be calculated by:

$$\overline{MSE}(y_1, \ldots, y_N) = \frac{1}{m}\left(\sum_{j=1}^{m} \sum_{i=1}^{N} (y_i - Z_{ij})^2 w_{ij}\right),$$

to be a function of N real variables. Standard calculus techniques produce a minimizer $y^{MIN}$, where the ith component is defined as:

$$y_i^{MIN} = \frac{\sum_{j=1}^{m} Z_{ij} w_{ij}}{\sum_{j=1}^{m} w_{ij}}.$$

From this, a normalized generalized MSE can be computed as:

$$MSE_{NORM} = \overline{MSE}(X_1, \ldots, X_N) - \overline{MSE}(y^{MIN}),$$

which results in a non-negative value.

The minimal value of the $\overline{MSE}$ defines a least possible value of the error, given that the expert ratings are given by the $Z_{ij}$ with erraticity weights $w_{ij}$. In comparing the MSE scores for two objects, the normalized MSE versions are utilized. For example, one rater obtains a score of 11 and another rater obtains a score of 2. It appears at first that the latter rater has performed closer to the benchmark. However, it may be (due to pool of objects that each has evaluated) that the minimal possible MSE score for the first rater was 10, whereas the minimal possible score for the second rater was 0. In this case, the normalized MSE's give values of (11−10)=1 and (2−0)=2, respectively. It can be seen that the first rater actually generated ratings closer to that of the benchmark.

It is noted that this normalization is unnecessary when both raters' rate the same body of objects, because then the $Z_{ij}$'s and $w_{ij}$'s are the same, giving the same minimizer $y^{MIN}$ for each. However, since the set of ratings examined typically vary from rater to rater, normalization may be appropriate.

It is further noted that the MSE may be divided by the difference of the maximal and minimal value, and thereby ensure that a number between 0 and 1 is obtained if desirable.

A Variance—Squared Bias decomposition of the generalized MSE can be performed, which provides reliability information. The decomposition can be performed as follows:

$$MSE_j = \left(\sum_{i=1}^{N} (X_i - Z_{ij}) w_{ij}\right)^2 + \sum_{i=1}^{N} \left[(X_i - Z_{ij}) - \sum_{l=1}^{N} (X_l - Z_{lj}) w_{lj}\right]^2 w_{ij}$$

$$= Bias_j^2 + Var_j.$$

The first term is the square of the Bias (the terminology arises from viewing $X_i - Z_{ij}$ as an estimator of 0), and the second term is the (weighted) variance. In some embodiments, this latter term may be used in the assessment of reliability, whereas the whole measure $MSE_j$ is used to measure validity. Averaging over the various experts produces average Squared Bias and Variance terms given by:

$$\overline{MSE} = \overline{Bias^2} + \overline{Var}$$

$$= \frac{1}{m} \sum_{j=1}^{m} Bias_j^2 + \frac{1}{m} \sum_{j=1}^{m} Var_j$$

In some cases, a rater may not attain a validity due to a high value of $\overline{MSE}$. However, it may be the case that Var value is low, in which case the rater is still reliable. A high MSE results from excessive Bias in the $\overline{Bias^2}$ term. These features are of interest in the phase of reliability and validity assessment.

In some implementations, it may be less advantageous to employ the previous construction. Since the weights depend upon object i and expert j, their calculation can be relatively complicated. If the weights depended only on the object i, then the formula for the averaged MSE would greatly simplify.

Another issue that arises when using these weights, is that experts who judge a large proportion of the object population have their judgments down-weighted in significance relative to other experts that judge a small proportion. The formula for the overall MSE is defined as:

$$= \frac{1}{m} \sum_{j=1}^{m} \sum_{i=1}^{N} (X_i - Z_{ij})^2 w_{ij}.$$

If the jth expert rates many of the objects, but the j'th expert rates only one, then the weight $w_{ij}$ will generally be lower than the weight $w_{ij'}$. As such, the corresponding discrepancy measure $(X_i - Z_{ij})^2$ are down-sized relative to the other discrepancy measure $(X_i - Z_{ij'})^2$. The only reason for this down-weighting, is because expert j rated more objects than expert j'. This results in unequitable comparisons, and alternatively, the discrepancy measure relative to each expert should be weighted equally.

To solve this situation, some embodiments use the pre-weights $v_i$ instead of the weights $w_{ij}$ in the MSE calculations. The preweights are defined to be the numbers $v_i$ for each object i, which are zero if the jth expert has not rated that object. Since these numbers have not been normalized, they do not suffer from the problem of down-weighting a discrepancy measure of an expert who has evaluated or rated large numbers of objects relative to other experts. In fact, calculating the overall MSE can yield:

$$\overline{MSE} = \frac{1}{m} \sum_{j=1}^{m} \sum_{i=1}^{N} (X_i - Z_{ij})^2 v_{ij}; \qquad (38)$$

$$= \frac{1}{m} \sum_{i=1}^{N} \sum_{j:Z_{ij} \exists} (X_i - Z_{ij})^2 v_i;$$

$$= \sum_{i=1}^{N} v_i \left\{ \frac{1}{m} \sum_{j:Z_{ij} \exists} (X_i - Z_{ij})^2 \right\},$$

where: $\frac{1}{m_i} \sum_{j:Z_{ij} \exists} (X_i - Z_{ij})^2 = \sum_{s} (X_i - s)^2 Q_i(s)$, results in:

$$= \sum_{i=1}^{N} v_i \frac{m_i}{m} \left\{ \sum_{s} (X_i - s)^2 Q_i(s) \right\}.$$

The inner summation in Equation (38) is an expectation with respect to the distribution of expert opinion on object i, which is $Q_i$. The outer summation is with respect to new weights $(v_i m_i / m)$. These do not sum to unity necessarily, nevertheless, they down-weight erratic objects and up-weight regular objects, as desired.

In implementation of the present invention, the above described analytical methodology can be employed utilizing either weights or preweights depending on desired goals of the implementation and analysis of the collected data. Utilizing the preweights may provide a simpler computation for the overall MSE. Further, the preweights can be calculated once, and stored in a database. Weights typically have to be recalculated each time a new rater is considered.

In some implementations of the present invention, the erraticity measure $\epsilon$ is used as a classification system. With an entropy measure $H_i$ for each object i and typically for each question on the exam, the various entropy scores can be summed over the set of questions to provide an overall entropy measure for each object. Additionally, the maximum value of the overall entropy can be calculated. The resulting summations can then be used to sort the objects according to their erraticity.

For example, one can rank the overall erraticity measures for the various objects, and obtain percentile splits (e.g., upper third, middle third, and lower third). Then those objects with overall erraticity scores falling in the respective range may be categorized as hard, medium, or easy in terms of ratability or judgeability. A practitioner employing the present invention can also designate an upper bound for erraticity, beyond which an object's rating data is not to be used (as one example, if $Q_i(s) < \frac{1}{2}$ for all s, then discard the data for object i).

As described above and in further detail below, the present invention allows for accurate training of potential raters. The ability to group or classify objects has particularly advantages applications in the area of practice or test rating design. For example, a rater can be given an easy, medium, or hard test, which would consist of judging or rating objects with low, medium, or high erraticity, respectively. In terms of progressive training, a rater can pass through novice, average, and expert ranking levels as the rater passes the various tests of increasing difficulty. In addition, the comparison of test scores can be controlled. For example, the comparison can be limited to MSE's for raters evaluated on objects from the same erraticity class or level (hard, medium, easy). However, the present invention provides accurate comparisons regardless of differences in erraticities of objects being rated due to the precise weighted calculations and compensations.

The application of erraticity sorting to test design is one possible implementation of the present invention. The ability to generate erraticity measures for each object is one of the advantages of the present invention. This may be utilized in a variety of ways, only a few of which are herein described.

In some embodiments of the present invention, the method of the bootstrap is used. The bootstrap refers to a computational method of statistics, which was originally used to estimate the variance of statistics that defied an analytical approach. It provides a procedure whereby pseudo-datasets are generated by repeated re-sampling from original data. These pseudo-datasets can then be treated as new, additional datasets which are equal to the original in distribution. A statistic can be calculated on each such data-set, and then sample variance of the statistic's values on the various pseudo-datasets can be found. By ensuring that the number of replicate datasets B is large, a close approximation to the statistic's actual probabilistic variance is achieved.

The present invention can use the bootstrap to partially or fully complete an incomplete expert dataset or database. If there are a total of N objects, the incompleteness of the expert dataset arises when each of m experts rates a potentially different subset of the N objects. When comparing an expert judgment with a rater's judgment, the measures are computed across the subset of the N objects that each expert and the rater have evaluated in common. The next rater might be compared with completely different experts, since their body of objects is different. With so many variations, there may be concern over the validity of making Kappa ($\kappa$) or MSE comparisons. If the expert dataset included an expert rating for each object, then the dataset or database would be complete. However, in often implementations of the present invention, the expert dataset may not be complete. In some embodiment of the present invention, the bootstrap is used to ameliorate this incompleteness.

One implementation of the bootstrap method according to one embodiment of the present invention is now described, where a fixed test question is used throughout. The possible categories for this test question are $\{0, 1, 2, \ldots, D\}$. The total number of objects being rated is N with a total of m experts rating the N objects. It will be apparent to those skilled in the art that the present invention can be applied to any number of test questions without departing from the inventiveness of the present invention. The rating or judgment by the jth expert (for 1 j m) on the ith object (for 1 i N) is denoted by $Z_{ij}$. As mentioned, there may be missing values among the ratings $Z_{ij}$ due to the fact that each expert may not have evaluated or judged each object. Next, let $Q_i$ denote the distribution of expert judgments on object i, computed over the available data, such that:

$$Q_i(s) = \frac{1}{m'} \sum_{j \in E_i} 1_{\{Z_{ij}=s\}}$$

where $E_i$ is the set of experts j that have data points for rating object i (and m' is the cardinality of $E_i$). The standard indicator notation is used where $1_A$ equals 1 if A is true and equals 0 if A is false.

As such, the set of measures $Q_1, Q_2, Q_N$ represents a full distributional profile of expert opinion on the object body. Taking Monte Carlo picks from this vector gives a new pseudo-expert opinion $W_1, W_2, W_N$. If this procedure is repeated B times, then data $W_{ij}$ is obtained where 1 i N and 1 j B. It is noted that this data is complete, and that each $W_{ij}$ is a random variable with distribution $Q_i$. Taking an expected value of a function of $W_{ij}$ is defined as follows:

$$E_i[h(W_{ij})] = \sum_s h(s) Q_i(s),$$

where the (linear) operator is denoted $E_i$.

The expert measures $Q_i$ are relatively easy to compute. When making Monte Carlo picks from the vector of expert measures, different objects are effectively treated as if they were independent. One could envision the construction of a joint expert measure Q of which the $Q_i$ are marginal distributions. This has the advantage of taking possible dependence between expert opinions across objects. Alternatively, one could only use experts that had judged the entire object population. However, this is typically unfeasible due to incompleteness. Therefore, the $Q_i$ is treated as independent.

The process of taking Monte Carlo picks is known in the art and will not be further addressed. Each random variable $W_{ij}$ takes on the value s with probability $Q_i(s)$. As such, a pseudo-random mechanism is used which generates the categories $s \in \{0, 1, D\}$ according to their probabilities $Q_i(s)$, and these outcomes are assigned to $W_{i1}, W_{i2}, W_{iB}$, successively. It is noted that B is typically under the control of the individual implementing the present invention. A larger B ensures convergence of the averaged MSE to a deterministic quantity, as shown below.

One use of the new pseudo-random data set is for the computation of the weighted MSE score. Since the bootstrapped data set is complete (there are no missing values), the weights $w_{ij}$ are no longer depend on j. This greatly simplifies computation, and gives greater validity to inter-rater comparisons (since each rater is compared against the exact same pseudo-expert database). Recall that the weighted MSE score for an object against the jth expert is:

$$MSE_i = \sum_{i \in F} (X_i - Z_{ij})^2 w_{ij},$$

where $X_i$ is the rater's judgment of the ith object, and F is the subset of the total object body that is considered by the rater. The weights $w_{ij}$ are chosen to compensate for high erraticity in the ith object. They depend on j only if there is missing data ($w_{ij}=0$ if $Z_{ij}$ is missing), and the sum $$\sum_{i \in F} w_{ij} = 1.$$

From this statement, it can be concluded that the weights also depend on the particular rater. Actually, pre-weights can be computed which depend only on the object (determined from their erraticity), but when normalized to unity the weights now depend on the actual rater. However, when utilizing the complete bootstrap data $W_{ij}$ the resulting MSE can be calculated as:

$$MSE_j = \sum_{i \in F} (X_i - Z_{ij})^2 w_i.$$

Though it appears to be a small difference, this facilitates easier computation. Now averaging all of these bootstrap MSE's provides:

$$\overline{MSE} = \frac{1}{B} \sum_{j=1}^{B} MSE_j, \quad (39)$$

$$= \sum_{i \in F} \left( \frac{1}{B} \sum_{j=1}^{B} (X_i - W_{ij})^2 \right) w_i.$$

Because the raters are compared against the same body of pseudo-experts, there is no issue of standardizing MSE. As discussed above, a minimum value of the total MSE as a function of rater response could be computed by:

$$\overline{MSE}(y) = \frac{1}{B} \sum_{j=1}^{B} \sum_{i \in F} (y_i - Z_{ij})^2 w_{ij},$$

which yields a minimizer $y^{MIN}$ defined as:

$$y_i^{MIN} = \frac{\sum_{j=1}^{m} Z_{ij} w_{ij}}{\sum_{j=1}^{m} w_{ij}},$$

for i=1, 2, N. With the complete pseudo-data, the minimizer reduces to:

$$y_i^{MIN} = \frac{1}{B} \sum_{j=1}^{B} W_{ij} =: \overline{W_i}.$$

It is noted that the minimal value of the MSE is then seen to be a weighted sum of the second sample moment of the bootstrapped data defined by:

$$\overline{MSE}(y^{MIN}) = \sum_{i \in F} \frac{1}{B} \sum_{j=1}^{B} (\overline{W_i} - W_{ij})^2 w_j.$$

This may appear quite intuitive in terms of projections. However, it can be concluded that each rater has the same minimum value, so there is no need to look at a normalized MSE. This assumes that bootstrapped data is created once, and the pseudo-experts are used against all considered raters. If fresh bootstrapped data is recreated for each rater, then the minimum values are different, and comparison becomes questionable once again (though for large B, there is no difference asymptotically, as discussed fully below).

In one embodiment, a second application of the bootstrapped data is used to impute missing expert data, and thereby complete the data set. Consider expert j's ratings on the object population, with a * denoting a missing entry. For example, if an expert generated ratings of:

$$Z_{1j}, Z_{2j}, Z^*_{3j}, Z^*_{4j}, Z_{5j}$$

for N=5, which says that the expert rated objects 1, 2, and 5, but not objects 3 and 4. The pseudo-data is then parsed through to find some l such that $W_{ij}$ matches the data for the jth expert that is actually available, i.e.:

$$W_{1l}=Z_{1j}, W_{2l}=Z_{2j}, W_{5l}=Z_{5j}.$$

Since there is already a close correspondence, $W_{3l}$ and $W_{4l}$ are used as imputations (or substitutions) for the missing values $Z^*_{3j}$ and $Z^*_{4j}$, respectively. If there are several matches from the bootstrapped data, one can be selected at random to fill in the missing values, or take the mode value appearing. If there are no matches at all, the bootstrap size B is increased until there are matches for all missing entries (this should happen eventually with probability one).

Some properties of the bootstrapped MSE are now explored given by Equation (39) for large B. By the Law of Large Numbers, it can be defined that:

$$\frac{1}{B} \sum_{j=1}^{B} (X_i - W_{ij})^2 \to E_i(X_i - W_i)^2,$$

as B with probability one. $W_i$ is a random variable with distribution $Q_i$, the same as any of the bootstrapped data. Due to the linearity of the weighted sum, the whole MSE also obeys the Law of Large Numbers:

$$\overline{MSE} \to \sum_{i \in F} (E_i(X_i - W_i)^2) w_i,$$

as B. Writing out the expectation provides:

$$MSE_{BOOT} = \sum_{i \in F} (E_i(X_i - W_i)^2) w_i \quad (40)$$

$$= \sum_{i \in F} \sum_s (X_i - s)^2 Q_i(s) w_i,$$

all of which quantities are known, and can be calculated. It is noted that, as described above, a consensus of experts was taken, an MSE was calculated with the mode $s^*_i$ (the maximizer of $Q_i$), so that $(X_i - S^*_i)^2$ would result instead of $$\sum_s (X_i - s)^2 Q_i(s)$$

above.

Subtracting the minimal value of the average MSE from the limiting value results in:

$$\sum_{i \in F} (E_i(X_i - W_i)^2) w_i - \sum_{i \in F} \frac{1}{B} \sum_{j=1}^{B} (\overline{W_i} - W_{ij})^2 w_i,$$

$$= \sum_{i \in F} E_i(X_i - E_i[Z_i])^2 w_i,$$

$$= \sum_{i \in F} (X_i - E_i[Z_i])^2 w_i.$$

Thus, the calculation of the normalized limiting MSE is simplified. These large sample properties identify what the bootstrapped data calculations converge to, and thus, they may be used in substitution of the bootstrap algorithm altogether.

An example is provided below showing one implementation of the present method and system. The data being evaluated through the present invention is based on data that might be obtained from a HAMD17 test. In this example, three raters are evaluated. The first rater rated four objects {1, 2, 3, 4}, the second rater rated two objects {3, 4}, and the third rater rated three object {1, 2, 5}. It noted that the object group for the second rater is a subset of the first rater's object group, whereas the second and third raters have disjoint object sets.

For purposes of comparison, the basic MSE is computed, which is the squared difference of rater and expert mode judgment, averaged (equally weighted) across the various objects. The following example considers a single question of the total HAMD test. The basic MSE calculations for the distribution of expert opinions yield:

$Q_1(0)=0, Q_1(1)=0.4, Q_1(2)=0.6, Q_1(3)=0, Q_1(4)=0;$ $Q_2(0)=0, Q_2(1)=0.75, Q_2(2)0.25, Q_2(3)=0, Q_2(4)=0;$ $Q_3(0)=0, Q_3(1)=0.0667, Q_3(2)=0.9333, Q_3(3)=0, Q_3(4)=0;$ $Q_4(0)=1, Q_4(1)=0, Q_4(2)=0, Q_4(3)=0, Q_4(4)=0;$ $Q_5(0)=0, Q_5(1)=1, Q_5(2)=0, Q_5(3)=0, Q_5(4)=0.$

The mode of the expert judgments is just the maximizer of Q, which gives the values 2, 1, 2, 0, 1, respectively, for objects 1 through 5. Recall that the general formula for the basic MSE is:

$$MSE = \frac{1}{N} \sum_{i=1}^{N} (X_i - \tilde{Z}_i)^2,$$

where $\tilde{Z}_i$ denotes the mode of $\{Z_{i1}, Z_{i2}, Z_{iN}\}$. This can be decomposed into Squared Bias and Variance, resulting in:

$$MSE = \left(\frac{1}{N}\sum_{i=1}^{N}(X_i - \tilde{Z}_i)\right)^2 + \frac{1}{N}\sum_{i=1}^{N}\left[(X_i - \tilde{Z}_i) - \frac{1}{N}\sum_{i=1}^{N}(X_i - \tilde{Z}_i)\right]^2$$

$$= Bias^2 + Var.$$

The first rater gave ratings of (1, 1, 2, 0) to the first four objects. As such, the MSE calculates to be: $\frac{1}{4}((1-2)^2+(1-1)^2+(2-2)^2+(0-0)^2)=0.25$. The Squared Bias and Variance work out to be 0.0625 and 0.1875, respectively. The second rater gave ratings of (2, 0) to objects 3 and 4. The MSE for the second rater calculates out to: $\frac{1}{2}((2-2)^2+(0-0)^2)=0$, which implies that the Bias and Variance are zero as well. This rater was perfect in comparison with the benchmark. However, it is shown below that objects 3 and 4 had much lower erraticity than objects 1 and 2, and thus rater two's performance should be re-evaluated in light of this knowledge. Below is shown that a different score for the erraticity-weighted MSE are obtained. Rater three rated objects 1, 2, 5 the assigned ratings of (1, 1, 1). Thus, the MSE calculates out to: $\frac{1}{3}((1-2)^2+(1-1)^2+(1-1)^2)=0.33$, with Squared Bias and Variance equal to 0.11 and 0.22, respectively. Even though raters one and three gave identical ratings to objects 1 and 2 (with one error relative to the benchmark), the fact that rater one interrogated one more object caused a lower MSE score to result for rater one. Note that their variance is close, but the Bias for rater one is considerably smaller.

A Kappa coefficient can also be computed for each rater and compared with the expert mode response across the body of objects resulting with: 0.64, 1.0, and 0.0, for first rater, second rater and third rater respectively. Recalling that a $\kappa=0$ indicates that the amount of agreement is no greater (or less) than that which would be expected due to chance. Also, $\kappa=1$ indicates total agreement (which is correct, for rater two). The middle score of 0.64 indicates a level of agreement greater than that due to chance alone. It is typically incorrect to quantify $\kappa$ scores as good, fair, poor, or otherwise.

In order to compute an erraticity-corrected MSE, the object entropies are first calculated. From the probabilities $Q_i$, the entropies are obtained as follows (using base 2 for the logarithm):

$H_1=0.971, H_2=0.811, H_3=0.353, H_4=0, H_5=0$

The erraticity weights are computed next. In the present example, a total of 20 expert's ratings were in the database (from which the Q's were calculated), indexed by $j\in\{1, 2, 20\}$. Consider for example the first rater where the error against the third expert $MSE_3$ is calculated. The Maximum Disagreement weights are initially calculated. In this example the third expert rated all four objects, so there is no issue of missing data (and so none of the weights are set to zero). As described above, the preweights are calculated to be:

$v_{1,3}=1.351, v_{2,3}=1.511, v_{3,3}=1.969, v_{4,3}=2.322,$ which are obtained by:

$v_{i,3}=\log_2(5)-H_i$

It is noted that these weights have no explicit dependence on j, the index of the expert, since the data is complete for that expert. Now the sum $v_{1,3}+v_{2,3}+v_{3,3}+v_{4,3}$ equals 7.152, and thus the weights calculate out to:

$$w_{1,3}=0.189, w_{2,3}=0.211, w_{3,3}=0.275, w_{4,3}=0.325.$$

Next the rating data is evaluated, where $X_i$ denotes the rating (judgment) of the first rater to the ith object, for i=1, 2, 3, 4. Also, $Z_{i,3}$ gives the third expert's assessment to the same body of objects. The rating data for both the first rater and third expert are as follows:

$$X_1=1, X_2=1, X_3=2, X_4=0$$

$$Z_{1,3}=2, Z_{2,3}=1, Z_{3,3}=2, Z_{4,3}=0.$$

The first rater's $MSE_3$ relative to the third expert is calculated as:

$$MSE_3 = \sum_{i=1}^{4} (X_i - Z_{i,3})^2 w_{i,3}$$
$$= (1-2)^2(.189) + (1-1)^2(.211) + (2-2)^2(.275) + (0-0)^2(.325)$$
$$= 0.189.$$

The Squared Bias and Variance calculate out to 0.036 and 0.153, respectively.

The procedure is repeated across the body of 20 experts, and the end result is averaged obtaining an $\overline{MSE}=0.123$. Averaging the Squared Bias and Variance terms for each expert, results in $\overline{Bias^2}=0.025$ and $\overline{Var}=0.098$. The calculation of the minimal value of the MSE can also be calculated. In considering the second rater, and performing similar calculations, $MSE_3$ for the second rater relative to the third expert can be derived as follows (recalling that the third expert rated objects 3 and 4, which is the total pool of objects that the second rater rated; thus, the weights will be nonzero, as there is no missing data):

$$v_{3,3}=1.969, v_{4,3}=2.322,$$

where the sum $v_{3,3}+v_{4,3}=4.290$. As such, the weights can be calculated resulting in:

$$w_{3,3}=0.459, w_{4,3}=0.541$$

In this case, the rating data is as follows:

$$X_3=2, X_4=0$$

$$Z_{3,3}=2, Z_{4,3}=0$$

It is noted the expert judgments are the same as for the first rater, since it is the same expert judge considering the same objects. But the second rater happens to have rated objects 3 and 4 identically with the first object (giving values 2 and 0, respectively). However, their values of $MSE_3$ are not the same, as can be seen by the following:

$$MSE_3 = \sum_{i=3}^{4} (X_i - Z_{i,3})^2 w_{i,3}$$
$$= (2-2)^2(.459) + (0-0)^2(.541)$$
$$= 0,$$

and thus the Bias and Variance are also zero. The overall MSE calculates out to be $\overline{MSE}=0.05$, a much lower value than for the previous rater. Also, $\overline{Bias^2}=0.05$ and $\overline{Var}=0$ are obtained, indicating excellent reliability (and validity).

For the third rater, the $MSE_3$ is calculated as follows:

$$v_{1,3}=1.351, v_{2,3}=1.511, v_{5,3}=0,$$

where the last pre-weight $v_{5,3}=0$ since this expert did not rate the fifth object. The sum is calculated as $v_{1,3}+V_{2,3}=2.862$, so the weights calculate out to:

$$w_{1,3}=0.472, w_{2,3}=0.528, w_{5,3}=0.$$

The ratings data from the second rater and the third expert are:

$$X_1=1, X_2=1, X_5=1$$

$$Z_{1,3}=2, Z_{2,3}=1, Z_{5,3}-\text{no data}.$$

As such, the $MSE_3$ for the second rater relative to the third expert equates to:

$$MSE_3 = (X_1 - Z_{1,3})^2 w_{1,3} + (X_2 - Z_{2,3})^2 w_{2,3} + (X_5 - Z_{5,3})^2 w_{5,3}$$
$$= (1-2)^2(.472) + (1-1)^2(.528) + 0$$
$$= 0.472.$$

The Squared Bias and Variance calculate out to be 0.223 and 0.249, respectively.

The overall $\overline{MSE}$ calculates out to be 0.144, a bit higher than the other values. In addition, Bias and Variance are $\overline{Bias^2}=0.071$ and $\overline{Var}=0.074$, respectively, an even split between consistent and inconsistent variation. However, in evaluating the expert's rating data for these objects, it is found that objects 3, 4, and 5 had very little erraticity (with entropies of 0.353, 0, and 0, respectively), whereas objects 1 and 2 were much more erratic (with entropies 0.971 and 0.811, respectively). Thus, a direct comparison of rater two with rater one does not provide an accurate evaluation of each rater, since rater one had much harder objects to rate than rater two. Rater three's poor score is due to rater three's incorrect evaluations of the first two objects. It is noted however, that rater three is more reliable than rater one (although the scores have not been normalized) because of the lower overall variance. As such, caution should be taken when drawing conclusions from the lower MSE of rater two. This points to the benefits of normalizing the MSE by the minimal value, or the expansion of the data set to completeness (perhaps by using the bootstrap). In terms of erraticity ranking, the first two objects might go on a medium difficulty test, whereas the latter three might be on an easy test.

The following continues the example with the calculation of the Large Sample Bootstrap MSE for the three raters, which is given by Equation (40). $MSE_{BOOT}$ values obtained are 0.184, 0.031, and 0.229 for raters one, two, and three, respectively. These have been tacitly normalized, so comparisons are highly valid. Rater two has the lowest value, as is to be expected. Raters one and three have fairly close scores, but rater one has the lower $MSE_{BOOT}$ and can be considered superior relative to the body of experts.

Table 1 summarizes the calculations and evaluations. It seems clear that the raters can be ranked in the order 2, 1, 3 from best to worst. For the three types of MSE and the κ score, this ranking is correct, and a validity assessment is obtained. As noted above, there is some indication that rater three may be more reliable than rater one, even though rater one's overall evaluation is better.

Measures of Raters

TABLE 1

Table of Evaluations of Raters

| Rater | MSE | Bias$^2$ | Var | K | $\overline{MSE}$ | $\overline{MSE}$p | $\overline{Bias^2}$ | $\overline{Var}$ | MSE$_{BOOT}$ |
|---|---|---|---|---|---|---|---|---|---|
| 1 | 0.25 | 0.0625 | 0.1875 | 0.64 | 0.123 | .0078 | 0.025 | 0.098 | 0.184 |
| 2 | 0 | 0 | 0 | 1.0 | 0.05 | 0.0625 | 0.05 | 0 | 0.031 |
| 3 | 0.33 | 0.11 | 0.22 | 0 | 0.144 | 0.0156 | 0.071 | 0.074 | 0.229 |

However, as is shown and fully described below, application of further significance methods provide more precise comparisons between the scores of raters. To generalize, the concept is to compute the distribution of any of the measures under a Null Hypothesis that the rater response is given at random (e.g., responses are given uniformly across categories and independently across objects). The p-values can then be computed for this test for the observed data. In Table 1, the $\overline{MSE}_p$ denotes the p-value for that rater's generalized MSE score, as described below. The interpretation of the p-value is provided by: the probability 100(1-p) is the highest percent significance for which the Null Hypothesis can be rejected given the data. The obtained p-values, as shown in Table 1, were 0.0078, 0.0625, and 0.0156. Ranking by the p-values for the generalized MSE, it can be seen that the former ranking is upset: 1, 3, 2. It is observed that the p-value of 0.0625 for rater 2 is the best possible under the small data size (two objects and four categories amounts to a 16 atom discrete distribution for the MSE). Typically, a distribution of at least 20 atoms (i.e., distinct values of the distribution) is used in order to ensure the possibility of p-values under 0.05. This can normally be achieved by using at least three objects with questions of at least three categories.

As an example, the p-values can be calculated. First, every possible "vector" of ratings that could be made are considered. For rater one, there were 4 objects rated, each of which could be given one of four ratings, this results in $4^4$=256 possible rating profiles. For example, the entry (0, 3, 2, 1) refers to the rating scheme where the first object is rated a 0, the second object is rated a 3, the third object is rated a 2, and the fourth object is rated a 1. The weighted MSE of that rating profile against the various experts can be constructed and summed. These 256 numbers represent the full Null Hypothesis distribution for that weighted MSE metric. By sorting these numbers from smallest to greatest, the observed MSE score can be located for rater one. It is noted that the sum of the expert MSE's is used, not the average, so this rater had a summed MSE score of 2.4646. Two values of the profile are lower than the observed value. Thus, the p-value is 2/256=0.0078. Similar calculations can determine the p-values for raters 2 and 3.

Rater performance scores provide some measure of agreement/disagreement between each rater and each expert. The following describes how these performance scores are used to determine the significance of the scores and, thus provide a comparison of raters. Additionally, objective thresholds can be established for determining a rater's ability to perform the rating of objects and to determine if retraining is needed. In a general form, an underlying distribution for each particular measure is computed, based on a random (e.g., uniform) response, and used to determine resulting quantiles of each recorded rater-expert measurement.

In one embodiment, the present methods and systems generate a measure of agreement and/or disagreement between a given rater and a given expert. Further, this generation of the measure of agreement is repeated across a body of experts. For example, a κ coefficient can be generated as a measure of agreement between a rater and each expert. Knowing these measures of agreement, the present invention determines the significance of a single measurement score and the meaning of a high or low value. The significance of measurement scores between various raters can further be determined, which is one desired implementation of the present invention. This information can additionally be compressed across the experts into one datum of significance.

In assessing the significance of measurements, the present invention implements objective analysis of the significance. Continuing the example above, if κ coefficients are generated for each rater, a concatenation can be performed of the κ statistics to allow rankings of the rater scores. Based on the ranked scores a threshold can be established to reject or accept the scores or rater.

For example, a threshold of the bottom 10 percent (which is set arbitrarily) can be set requiring the bottom 10 percent to go through retraining. In this case, the decision to retrain is dependent on a rater's fellow-raters. In a population of size 10, the bottom rater (e.g., rater A) is retrained according to the threshold established. If instead another 5 raters were included in the population, and one of the additional 5 raters performed worse than rater A, then rater A is no longer selected for retraining. So, the decision to retrain would be dependent on which sets of rater data happen to be considered.

Alternatively, if the cutoff is set to be some numeric value, rather than a percentage, then the problem of how to standardize the measures is encountered. The present invention provides a method and system for assessing significance of rater performance and measures of agreement/disagreement with a benchmark. In one embodiment, the present invention utilizes a nonparametric method for assessing significance.

Consider a collection of K raters and J experts, with k and j as the respective indices. It is assumed that a distance measure, such as a measurement of agreement, $M_{kj}$ has already been computed between the jth expert and the kth rater. Several examples of $M_{kj}$ are discussed below (κ coefficient, weighted MSE, weighted Var, and the like). It is further assumed that measures for each question or item of a total test exist. For the moment, the fact that the measures depend on the test item is ignored, but addressed below.

Organizing the measures, a data matrix M, referred to as the Measurement Matrix can be obtained. The kth row consists of the various measurements of agreement between the kth rater and the various experts, while the jth column consists of the various measurements of agreement between the jth expert and the various raters. Typically, the analysis is concerned with a row analysis (i.e., how does one rater's measurements compare with another rater's measurements).

The following are some examples of agreement measures M, however, the measures of agreement that can be used in the significance assessment are not limited to the measures listed below. It will be apparent to those skilled in the art that other measures can be utilized without departing from the inventive aspects of the present invention.

κ Coefficients: a κ coefficient is computed between each rater k and each expert j, which is denoted by $\kappa_{kj}$. The common body of objects considered between expert j and rater k are considered, and the chance-corrected proportion of agreement is computed. It is noted that, given the body of objects and the expert ratings on those objects, limited values of κ are attainable. This fact is used to compute significance for the κ versus a random selection of ratings.

Weighted MSE: the calculation of weighted MSE is described above and can be used as the agreement measure $M_{kj}$ between the kth rater and the jth expert ($MSE_{kj}$). It is a measure of reliability and validity with respect to the jth expert (when viewing the expert as an objective benchmark for truth). As described above, the average of the weighted MSE across the group of J experts as an overall validity measure for each rater can also be considered.

Weighted Var: decomposing the weighted MSE into squared bias plus variance, where the variance is referred to as Var, and may be interpreted as a measure of reliability. The $Var_{kj}$ can be the weighted variance measure between kth object and jth expert, and applied to the significance analysis for the purpose of reliability discernment.

As described above, the weighted MSE can be used as a measure of significance. In one implementation, averaging across columns (of the measurement matrix) obtains an average MSE for each rater. The average MSE can then be sorted to produce a ranking. However, this ranking can suffers from the defects mentioned above, where the introduction of additional raters may bring a below par rater above the threshold simply because of the number of raters.

In one embodiment, a random distribution of possible measurement scores $M_{kj}$ are used to compensate rater scores to provide significance between raters. Generally, the distribution of possible measurement scores $M_{kj}$ are determined by a completely random mechanism. Each rater is an intelligent, trained human making ratings or judgments about one or more complex objects. Substituting their judgments by random (uniform) simulations results in the full distribution of possible scores $M_{kj}$. The random rating can be seen as if a chimpanzee, for example, is rating each object by hitting various colored knobs at whim. As such, the use of the random distribution in determining significance can be denoted the chance significance or chimp significance.

For example, consider a fixed rater k, whose measurement scores $\{M_{kj}, 1 j J\}$ are each a function of judgments $X_1, X_2, X_N$ delivered by the kth rater upon each of N objects. This is true, whether considering κ scores, weighted MSE or other measures. Designating the measurement score as a function of these N ratings, the measurement score can be written as $M_{kj}=M_{kj}(x_1, X_2, X_N)$, where lower case x denotes generic input values to the function, while capital X designates an actual recorded value of the measurement from the data. Also, for each rater, the set of objects may potentially change, but one set of values $\{X_1, X_2, X_N\}$ is used to compute $M_{k1}, M_{k2}, M_{kJ}$. Suppose that the number of possible categories for the particular question is C. Then, to calculate the distribution of some $M_{kj}$ with respect to chance, each $x_1$ is viewed as a random variable distributed uniformly across the C categories. Using this distribution, the probability of getting a measurement value greater than or equal to the observed $M_{kj}$ can be computed (i.e., $M_{kj}(X_1, X_N)$). In one embodiment, all possible values of $M_{kj}$ are determined as a function of $^{-1}\{x_1, X_N\}$ (the range space is at most size CN). The results are sorted, and it is determined where the observed value $M_{kj}(X_1, X_N)$ fits into a ranking. The results are typically a percentage $q_{kj}$.

The interpretation of the percentile $q_{kj}$ can be as follows: for the kth rater compared to the jth expert according to the measurement $M_{kj}$, a chance rating would result in a better rating $100(1-q_{kj})$ percent of the time (e.g., a chimpanzee would have done better $100(1-q_{kj})$). With this significance scheme, it is possible to assign more objective assessment criteria. For example, it can be decreed that $q_{kj}$ 0.95 for all j∈J in order for rater k to pass the test or attain a certification of accurate rating.

In one embodiment, a condensation of the data is utilized due to the fact that a percentile $q_{kj}$ for each rater and expert is obtained, resulting in KJ percentiles (potentially a preponderance of significance information). Because the significance is based on an overall performance with respect to all experts (or all experts of a subset), and little significance is placed, in the end, on whether a rater scored better or worse versus a particular expert, the present invention utilizes, in one embodiment, a summation across the experts as a condensation of the data. Alternatively, an average can be taken and used as the condensation, but division by a constant has relatively no bearing on the determination of significance percentiles. As such the row sums of the Measurement Matrix are utilized, where:

$$M_k = \sum_{j=1}^{J} M_{kj},$$

which are each a function of ratings $\{x_1, X_2, \bullet, x_N\}$. Again, by randomly generating chance responses $\{x_1, x_2, \bullet, x_N\}$ and plugging them into the measure $M_k(x_1, x_N)$, the full distribution of $M_k$ is obtained, and the percentile significance of the observed measurement $M_k(X_1, X_N)$ can be determined. From this procedure the percentile rankings $q_k$ for each rater k are obtained.

More generally, the various statistics of the rows of the measurement matrix can be considered. These are functions, for a fixed k, of the various column entries $\{M_{k1}, M_{k2}, M_{kJ}\}$. If the kth such statistic is denoted $S_k$, by determining the distribution of possible responses with respect to chance for each statistic $S_k$, a percentile $q_k$ is obtained. This percentile provides a particular interpretation, according to the chosen statistic. For the sum statistic $M_k$ discussed above, it can be said that for the kth rater measured according to the measurement type M, considering the total of all measurements across all experts, a chimpanzee would have performed better $100(1-q_k)$ percent of the time. As another example, suppose that $S_k$ is the maximum of the entries in the kth row, given by:

$$S_k = \max_{1 \leq j \leq J} M_{kj}.$$

The corresponding $q_k$ can be interpreted as the probability of getting at least as good a score as a chimp, for the kth rater, considered against a range of experts in their worst-case performance. Many such statistics and significance interpretations are possible as will be apparent to one skilled in the art.

The described significance percentile (e.g., summary percentile) can be applied for substantially any measurement method M. For example, K coefficients, weighted MSE, and weighted Var were mentioned as possible measures of agreement. In the latter case, the weighted Var measure can be used to obtain significance percentiles $q_{kj}$ (or summary percentiles $q_k$) for any statistic of the measurement matrix rows desired. Since bad reliability implies bad validity, significance can be computed for weighted Var first, to determine reliability. Then, if the rater passes reliability thresholds, a subsequent validity assessment can be conducted utilizing, for example, weighted MSE.

To this point, the significance analysis has been considered for a single item or question. This significance analysis can be expanded to apply when several items are present, as components of an entire test. Because each question has a separate range of values (and varying opinion as to whether they constitute good or bad questions), there can be disadvantages in blithely summing weighted MSE across the various questions. Alternatively, in some embodiments, the present invention maintains each question separate.

Knowing summary significance assessments $q_k$ for each question on the test, if there are L questions (letting l be the question index), then there are $q_{k1}$ significance assessments. If row summaries of the measurement matrix are not performed, the significance percentiles depend on three indices. Due to the calculation complexities associated with three indices, it is assumed, that some sort of row summarizing is performed. However, the present invention is not limited to determining significance assessments with row summarizes, and can be implemented without row summarizes to achieve the significance assessment.

In some embodiments, the relative rankings of raters are not the issue of concern, but rather their passing of certain predetermined threshold percentages. As such, there are limited advantages in combining the $q_{k1}$'s. In one embodiment, a percentage threshold is set for each question l. Each rater is evaluated to determine if the rater's percentile values exceeding the threshold for all questions or for a critical mass of questions. This procedure allows the flexibility to throw away ambiguous questions (amounting to setting the threshold to zero), or to set higher thresholds for easier, less ambiguous questions.

Mathematically, if thresholds $t_l$ are assigned for questions 1 1 L. Then the condition for certifying a rating, or passing or certification of rater k during training is:

$$q_{k1} \; t_l, \; 1 \; 1 \; L \quad (41)$$

Equation (41) can be modified by count up the number of questions that the $k^{th}$ rater passes the threshold level, and requiring that this tally exceed a critical mass l*:

$$Cert_k = \sum_{l=1}^{L} 1_{(q_{kl} \geq t_l)}, \quad (42)$$

with certification of the data and/or rater occurring if $Cert_k$ l*. This allows for the option of certifying data and/or raters who fail to pass thresholds for measurement significance on a few items. Additionally, the certification can be limited to require the passing of thresholds on one or more specific questions, in addition to passing a critical mass l*.

In determining threshold values $t_l$, it is noted that the percentile significances $q_{k1}$ are computed with respect to chance (a chimp). As such, the threshold can be determined by quantifying how much better a rater should be over chance on a particular item.

The significance assessment can further be interpreted in terms of hypothesis testing. If each row measure calculation $S_k$ is viewed as a statistic of the rater data $\{x_1, x_2, x_N\}$, written $S_k(x_1, x_2, x_N)$, then the distribution of $S_k$ can be conditional on hypothesized distributions. The approach of chance (or chimp) significance is to assume a Null Hypothesis of the uniform distribution on the variables $\{x_1, x_2, x_N\}$ considered independently. Let the C categories be denoted by $\{1, 2, C\}$, then a Uniform random variable on this set takes on each value in $\{1, 2, C\}$ with probability 1/C (this distribution is denoted by U(1, 2, C). The Hypothesis Testing formulation is:

$$H_0: x_1, x_2, x_N \sim \text{iid } U(1, 2, C);$$

$$H_1: \text{not } H_0.$$

The notation iid represents independent and identically distributed where it is assumed that the various object cases are statistically independent.

The Null Distribution of the statistic $S_k$ can be calculated, either analytically or empirically. That distribution is denoted by:

$$P[S_k(x_1, x_2, x_N) \in \cdot | H_0].$$

With a significance level $\alpha$ determined, then the Null Hypothesis can be rejected with confidence 1–$\alpha$. This occurs if the calculated value is below a threshold quantile $p_\alpha$. That is:

$$\alpha = P[S_k(x_1, x_2, x_N) \leq p_\alpha | H_0].$$

A value for $p_\alpha$ is computed as the critical value of the test, for each pre-specified level of significance $\alpha$. But this critical value $p_\alpha$ corresponds precisely to the threshold value $t_l$ for the lth question. If the computed value of the statistic is lower than the threshold $p_\alpha$, then the Null Hypothesis is rejected, which amounts to certification of the data (and/or a pass or certification of a rater) on that particular question, i.e., reject $H_0$ if:

$$S_k(X_1, X_2, X_N) p_\alpha.$$

As described above, this was formulated instead by computing the empirical quantile of $S_k(X_1, X_2, X_N)$, which is $q_{k1}$ for the kth rater and lth question. This was then compared to the threshold quantile $t_l$, and the rejection criterion can be formulated equivalently as: $q_{k1} \; t_l$. It is noted that $t_l = 1 - \alpha$ for the significance level $\alpha$. Thus, certification corresponds to a series of rejections of various Null Hypotheses.

It may be of more practical use to report the p-value for each rater on each question. The rank of $S_k(X_1, X_2, X_N)$ is determined among the various possible values under the Null Hypothesis, sorted from least to greatest. If $S_k(X_1, X_2, X_N)$ is a repeated value, a convention can be followed such that the rank obtains the smallest rank possible. Assuming this rank is an integer r, such that $C^N - r$ values are ranked beneath the observed value, the probability of getting the value $S_k(X_1, X_2, X_N)$ or lower can be calculated as: $p = r/C^N$, which is equivalent to the p-value. This is true, because if the significance of the test is set at any level $\alpha < r/C^N$, the corresponding critical value would have to be a number strictly less than $S_k(X_1, X_2, X_N)$ (this follows from the convention regarding repeats), and this results in non-rejection of $H_0$. Thus p is the smallest significance level such that the Null Hypothesis can still be rejected, given the data.

As described above, the present invention can additionally provide for training of individuals or groups of individuals to administer ratings of objects. In one embodiment, the instructional model is a construct that provides a backbone and building blocks to produce an executable training session. It serves as a template upon which instruction and/or an instructor can organize and communicate desired educational content to an audience of an individual or multiple students. The present methods and systems provide training in a modular fashion configuring the educational structure to be adjustable and susceptible to the influence of a variety of different input.

The anatomy of the instructional model consists of three primary components, including relevant educational content desired for dissemination during the training process, perceived avenues of instructor/student interactivity, and procedures outlining relevant methods of communicating the content.

Educational content can be envisioned as the building blocks afforded by the instructional model. These blocks of content are the source materials used to compile descriptions of subject matter, and form the foundation upon which the context and vocabulary of the training process are created and applied. Effectively communicating the intellectual substance of such content often relies heavily on the accuracy, consistency, and breadth of its representation to others. The present invention employs versatility of content representation to provide effective educational processes. Typically, the source materials comprising educational content are derived and maintained in a meta-state.

For example, the demonstration of a rater or investigator conducting a particular diagnostic interview can be represented in a multitude of different ways. A dialogue of the interview can be textually transcribed, captured as an audio recording, video recording, or as the subjective interpretation or reenactment of the event by a witnessing third party. The methods and systems provided by the present invention allow for these transitive representations of content to be logically associated, documented, and organized relationally as a database. Thus, for situations in which it is not possible to predetermine which particular representations of content would best accommodate cognitive and intellectual requirements of students, the warehouse of representation intermediaries makes it practical to forego complete assembly of core educational content representations until empirical assessments of student proficiency can be obtained directly within the training environment.

Information derived from such assessments is then utilized in the tailoring of representations to specifically meet the perceived educational needs of the students, while they participate in the training exercise. This functionality is achieved through the componentization of partially matured representations of intellectual content within the store of content, for example within a database. The process of modular assembly functions to maximize the potential versatility of a representation by allowing it to be completely rendered at the time upon which it is recruited into the training exercise.

The ability to practically implement the modular assembly of content representations utilizes preconceived knowledge regarding various possible avenues of student/instructor interactivity. Anticipating circumstances likely to be encountered during the training process greatly affects the quality of the observations of student performance within the training exercise.

Historical performance data along with other existing empirical documentation of the subjective measurement technique and relevant subject matter are used to predict potentially relevant trends and scenarios of student/instructor interaction.

Depending upon the nature and quality of both predicted and actual observations of student/instructor interaction, it may become desirable to modify the content and/or procedural components of the instructional model described above. Alteration of the preconceived model is performed in an effort to better acclimate the scope of the training and assessment processes to specific (perceived) strengths and weaknesses exhibited through the active participation of the students within the training environment. This form of accommodation constitutes a diagnostic filter, acting to eliminate potential sources of variance by removing irrelevant variables form the analysis of student performance. Proactively excluding extraneous information from the analytical process literally corresponds to a measurable decrease in the overall complexity of the system (i.e. the experimental construct in which the student's performance is evaluated), thus substantially increasing the likelihood of conducting more reliable (and thus potentially more valid) assessments of student performance.

Thus, the resulting interactivity predictions can be organized into a logical array of possible outcome paradigms upon which content filtering devices can be superimposed. The purpose of applying content filters is to provide a sufficient regulatory mechanism for ensuring that associations between appropriate measurement technique and example representations/demonstrations can be constructed reliably, and without violating the constraints enforced by predefined standards of practice and the nature of the subject matter in which the association is expressed.

The results of the pre-conceived content and interactivity modeling scenarios are used as inputs into the process of determining an order in which topics may be most efficaciously demonstrated, addressed, and assessed within the model training environment.

Properties of student/trainer interactivity that are later observed within the actual training session environment are additionally included as a source of input into the procedural modeling process described above. The utilization of this additional input source is intended to provide a mechanism in which to introduce various forms of feedback that are derived from an analytical assessment of student behavior as it is measured both directly and indirectly within the training environment. The difference between the run-time assessment of student behavior and the pre-conceived instructional model renders an error metric that may potentially be used to adjust the sequence of instruction dynamically, and at run-time. This functionality consequently allows for controlled and systematic restructuring of the model of instruction to be possible.

Figure 4:
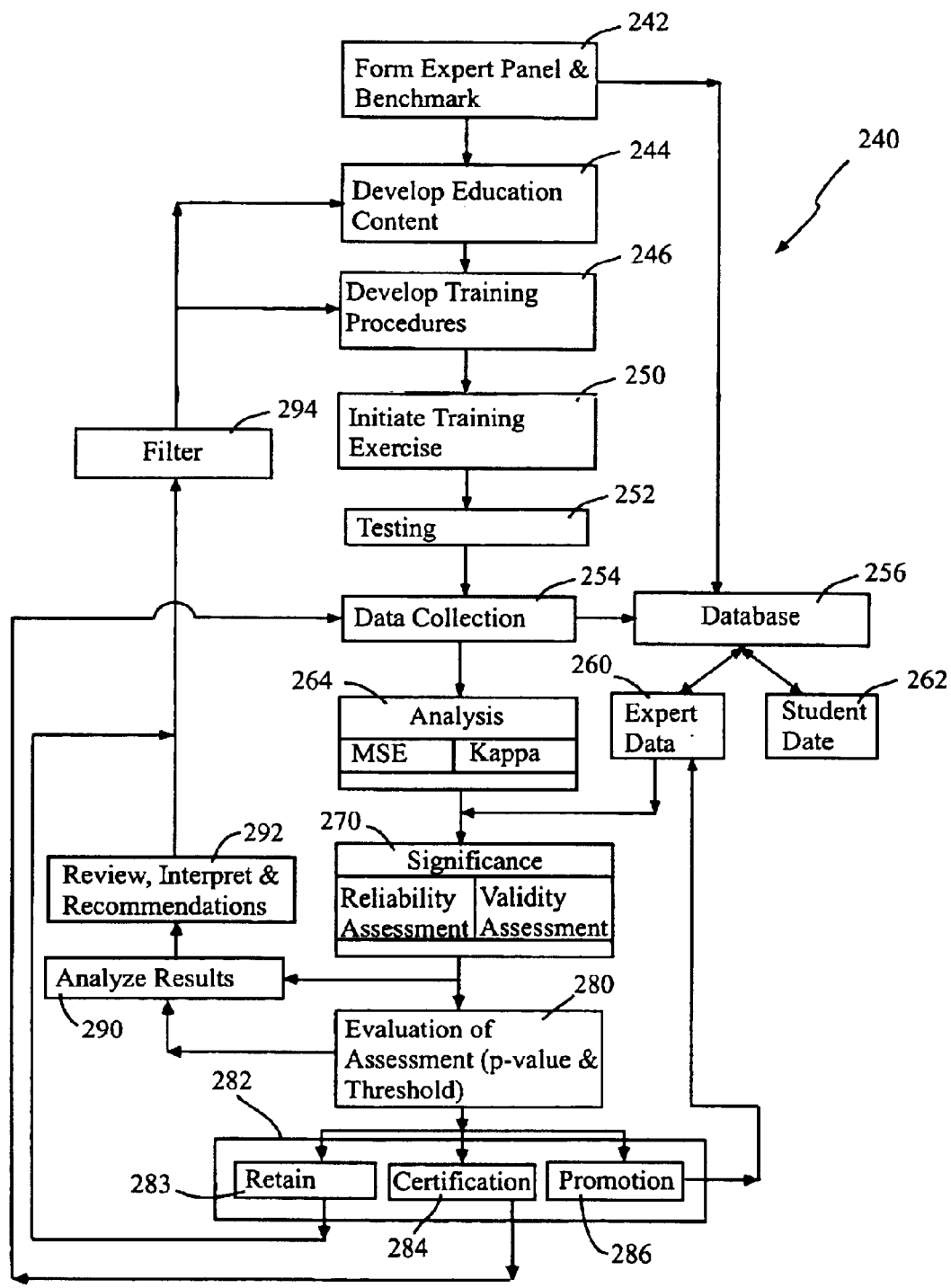
FIG. 4 depicts a simplified flow diagram of one implementation of the educational or training process according to one embodiment of the present invention.

FIG. 4 depicts a simplified flow diagram of one implementation of the educational or training process 240 according to one embodiment of the present invention. One example of training is the training of students to correctly administer a given subjective measurement device (e.g., HAMD) to a particular subject or object. In step 242, the expert panel is formed and the benchmark is established. This step can be implemented as described above or through other methods. For example, the advisory panel or group of experts is distinguished from the rest of the raters. They are either placed in the expert category historically or axiomatically (e.g., either they come to this group through consistent valid performance and demonstration of superior judgment, or they are placed there by fiat, due to considerations of the practitioner/instructor/educational program developer, and the like).

Once the benchmark and expert rating data is collected, the benchmark and expert ratings are stored in step 256, typically in a database. In step 244, the educational content is developed. This includes determining what types of objects are to be evaluated, the type of information to be collected, the types of material to provide to the students, the type of instruction to incorporate, and the like. In step 246, the training procedures are developed. This includes determining the organization of the training materials to be presented, the presentation of the material, the number of objects to evaluate as practice and testing, and the like. Initially, this can be based on educational theories and input from experts.

Once the training of student raters has begun, feedback information is provided to allow reevaluation of the training content as well as the training procedures to determine adjustments to further optimize training. These adjustments can be made based on a group of students or individually for each student. In some implementations of the training process, each student receives direct feedback from the training instructor and/or system. For example, the training system can supply the student with the educational content. The system can further evaluate student performance as the training progresses, and initiate changes to the educational content and/or procedures to address the student's strengths and weaknesses. The system can further provide evaluations and further instruction to the student during the training process, including during a practice administration of a measurement device.

Once the training procedures are developed, the training is initiated in step 250.

Again, the training can be through substantially any form of training, including one-on-one training with an instructor and student, class training with a group of students receiving instruction from an instructor, through an interactive system (such as a computer system) either directly accessed by the student(s) or remotely accessesed (e.g., over the internet), on site training, apprenticeship, substantially any other techniques or method of training, or substantially any combination of techniques for training.

Following some or all of the training, each student is tested in step 252. The testing can be through substantially any testing including, assigning students to directly evaluating one or more objects, evaluating a simulation of one or more objects, reading a transcript of an evaluation of an object, viewing a video of an evaluation of an object (e.g., a video of the HAMD test being administered to a patient), viewing a reenactment of an evaluation of an object and other such testing methods. The data obtained for these objects may or may not be actually used for purposes other than performance analysis. In step 254, the student's ratings collected during the evaluation of the one or more objects are compiled and/or collected.

The accruement of student data can be facilitated by a number of devices, as such as an audience response system keypad, or a computer keyboard in association with a particular software client application. Additionally, a training exercise administrator or instructor can manually enter student results, as they are gathered from lower-technological mediums such as handwritten ratings, hand generated numerical ratings, and the like. After the data is collected, some sorting is done to classify and identify the data properly, so that it may be stored and made available for subsequent analysis. A database device can be used to provide the means in which to accurately process large amounts of data contributed by student raters. It is reasonable to expect that each student rater will have data ranging across a number of subjects, and across time as well.

Once the data is collected, it is stored in step 256. The data can be sorted to classify and identify the data so that it may be stored and made available for subsequent analysis. The data is typically stored in a central database, but alternatively can be stored in a distributed fashion throughout a number of storage locations. The database allows for accurate processing of the large amounts of data contributed by the student raters. The database can be configured to include expert data 260 and student data 262. The data can be stored through a relational database management system (RDBMS). This organizational structure allows data accrued from students to be queried and returned for the purpose of analysis and computation.

In step 264, the collected data is analyzed. The analysis includes determining distance measures (e.g., measures of agreement and/or disagreement) of each student's data relative to the benchmark. For example, an MSE, weighted MSE, Kappa, weighted Kappa and metrication of distributions, and other such metrics can be generated to establish a distance measure between each student and the benchmark. In step 270, the significance of the distance measures are assessed. For example, a reliability assessment and a validity assessment can be performed in evaluating a student's performance relative to the benchmark. In one embodiment, the Variance term in the MSE is examined and compared, along with other relevant metrics. Reliability between students (coherence) and reliability of a student across time (stability) are typically both considered. In addition to reliability, validity is also assessed. Validity is assessed, in one embodiment, through MSE and Kappa scores, and other relevant metrics. Again, the reliability assessment plays a role in the determination of validity (but not conversely).

In step 280, an evaluation of the assessments is performed. For example, a p-value can be generated and compared with a threshold. Based on the evaluation of the assessments, a recommendation is issued in step 282. For example, if the student assessment falls below the threshold, the student is requested or required to perform additional practice exercises or retraining 283. The recommendation for retraining can be measured not only in terms relative to other students, but also relative to the rater himself/herself across time (e.g., when some amount of improvement over time is required and failure to meet these improvements thresholds merits the use of retraining). If the student assessment is above the threshold, the student can be designated as sufficient in performing the test in question and allowed to proceed to a next level of training or be certified as trained 284. If the student assessment exceeds the threshold by a defined amount, or if the student consistently exceeds the threshold, the student may be promoted to expert 286. Similarly, it is possible to demote experts that perform poorly or who perform poorly again and again.

If the student needs additional practice or retraining, the process proceeds back to step 244, through a filtering step 294 (describe fully below) to receive retraining. If the student is certified in step 284, the student data is stored as certified data for future use and evaluation. If the student is promoted in step 286 to expert, the student data is labeled, and additionally stored or transferred to the expert data storage for uses in the benchmark of future students and potentially for future evaluations of actual collected data.

In step 290, the significance assessment and/or evaluation of the significance assessment is forwarded to be analyzed for a number of reasons. One of those reasons includes the evaluation of the effectiveness of training for the student or students. Based on the evaluation of the training, the process proceeds to step 292 where review, interpretation and recommendations are performed and issued to adjust the training. The recommendations as well and the student assessment and issuance of retraining (step 283) are forwarded to a filtering step 294. The filtering focuses training or removes irrelevant variables from the training to address strengths and weaknesses of the student. This increases the likelihood of conducting more reliable (and thus potentially more valid) training of students. The results of recommendations 292 and filtering 294 are forwarded to step 244 and 246 for re-evaluation and altering of the educational content and training procedures to focus the training.

As mentioned above, the present invention can be implemented in real-time. Once the databases are organized, data is collected through client/server software interface(s), run through a computer implementation of the analysis step 264 and an automated significance and assessment step 270 to provide immediate feedback in the recommendation step 292 and retraining step 250.

The process 240 can additionally be passed through a sanity check. An expert can be selected from the expert panel, treated as a student, and passed through the procedure 240, where the expert should be categorized as certified or expert. If too many experts fail the evaluation, then there is an indication that the educational procedure may be flawed. This provides an internal diagnostic of the procedure.

Figure 5:
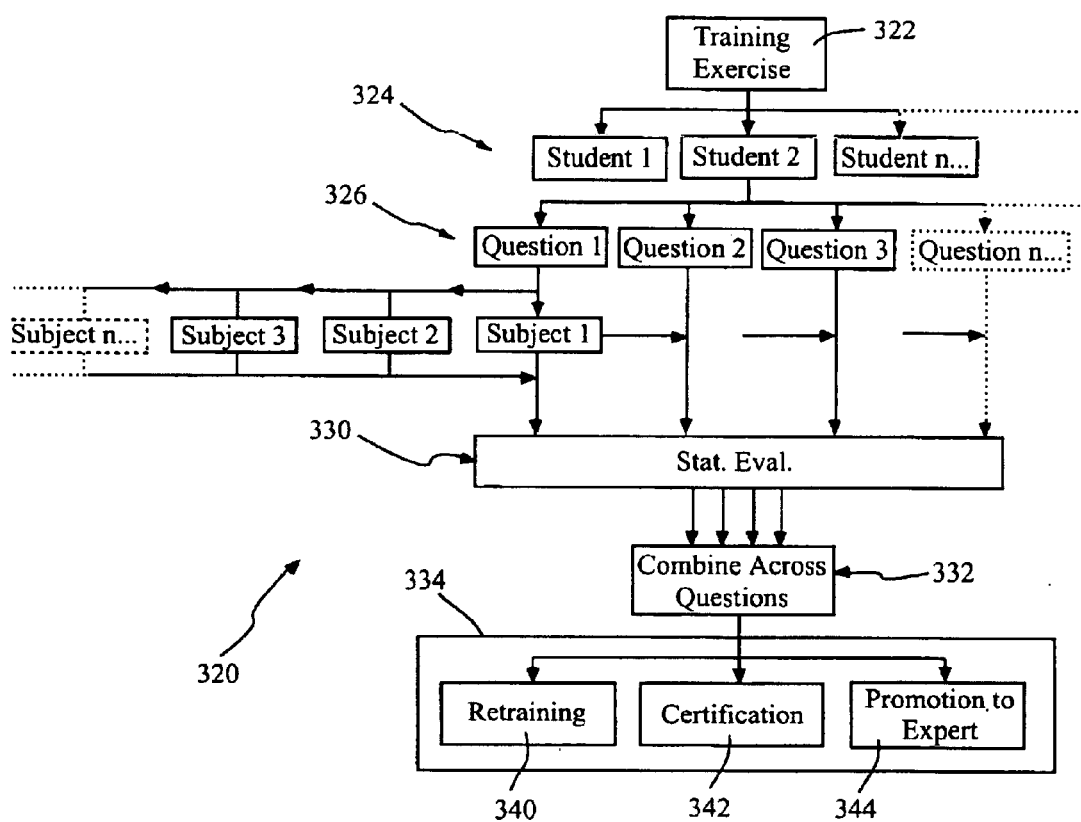
FIG. 5 shows a simplified flow diagram according to one embodiment of the present invention of a process for evaluating one or more student raters based on the students evaluations of objects.

FIG. 5 shows a simplified flow diagram according to one embodiment of the present invention of a process 320 for evaluating one or more student raters based on the students' evaluations of objects and the data collected about the objects. In step 322 the training exercise is established. One example of the training exercise can be instructing each student to evaluate an object and rate the object based on their evaluation. For example, the student raters may be required to administer a HAMD test to a patient and collect ratings according to the patients' reactions and responses to questions of the HAMD test. As another example, the student raters may be instructed to view a video of a patient being administered the HAMD test and the student raters are to rate the videoed patient based on responses and reactions to the questions.

In step 324 the student rater initiates the training exercise. In step 326, the student raters rate an object or subject and their ratings are collected. For example, the student raters can ask a first question of the HAMD test to a patient and rate the patient's response. Step 326 is repeated until the student raters fully evaluate the object or subject. In continuing the above example, the student raters continue to ask all of the questions of the HAMD test to the patient. Step 326 can further be repeated for a plurality of objects or subjects.

Following step 326, the collected ratings data from the student raters is forwarded to be statistically evaluated in step 330. In one embodiment, the step of statistically evaluating the collected data is employed utilizing the process of evaluating collected data 150 shown in FIGS. 1–3. In step 332, the results of the statistical evaluation are combined for all the questions and/or all the subjects rated. In some embodiments, this is included in the steps of local and other condensation steps 182 and 186 of FIG. 2 for a single object. Step 332 can be utilized to compile all significance assessments determined through step 162 of FIG. 1, for all of the objects rated. In step 334, the significance assessment of each student rater is examined to determine the effectiveness of the rater in performing the rating of the object. If the rater did not perform up to a desired standard (e.g., the p-value is below a predefined threshold) step 340 is entered where the student requires retraining. If the student rater's performance meets the desired standards (e.g., the student rater's p-value is above the threshold) step 342 is entered where the student rater passes the training exercise and/or given a certification. If the student rater performs exceptionally well, or has shown over a plurality of objects to perform up to the desired standard, step 344 is entered where the student rater and collected data for each object are designated as expert and incorporated into the standards of conventions or benchmark.

The process 320 can be equally applied to the reevaluation of experts. One or more expert raters can be classified as student raters, and instructed to evaluate one or more objects (step 326). The ratings of the expert are then statistically analyzed according to step 330 and combined in step 332. In step 334, the expert is evaluated. In some embodiments, the threshold that the expert must exceed to maintain expert status is elevated over a threshold needed to meet the certification criteria.

Figure 6:
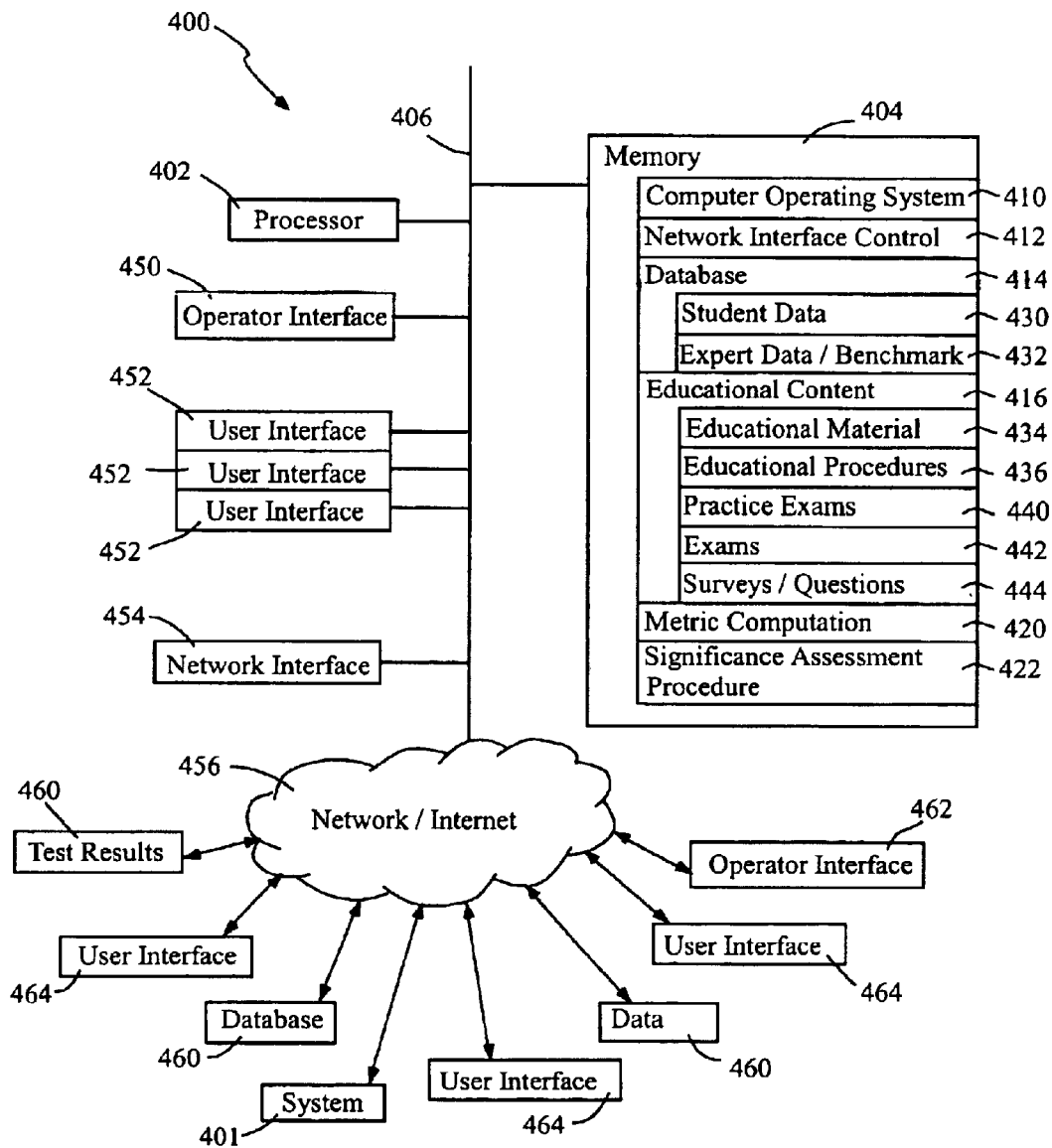
FIG. 6 depicts a simplified block diagram of a system for collecting and statistically analyzing data according to one embodiment of the present invention.

FIG. 6 depicts a simplified block diagram of a system 400 for collecting and statistically analyzing data according to one embodiment of the present invention. As described above, the data can be substantially any data, and particularly subjective data. Typically, the data is collected based on raters evaluating and rating objects. The system 400 can additionally be configured to maintain and update educational content and procedures, as well as administer training. The training can be administered solely from the system 400, utilized in cooperation with instruction from an instructor, or other similar ways of educating student raters.

The system 400 includes a controller 402, such as a central processing unit (CPU), one or more microprocessors, and/or other devices to control the system. The system further includes digital storage or memory 404. The controller couples with the memory through a system communication line or bus 406. The bus 406 is typically configured to couple with all of the components of the local system 400 allowing data transfer and communication between the system components. The memory 404 can consist of local and remote memory, and can include a hard drive, ROM, RAM, tape drive, floppy disk drive, external memory, and other similar storage devices. The memory can include a computer operating system 410, network interface control 412, database 414, educational content 416, distance and metric computational procedures 420, significance assessment procedures 422 and other such divisions.

The database 414 can be subdivided into any number of sub-databases such as collected student ratings 430, expert ratings or the benchmark data 432, and other sub-databases. The educational content 416 can include educational materials 434, education procedures 436, practice exams and/or practice tests 440, examines and/or tests 442, surveys and/or collections of questions 444, and other similar educational material and content. In one embodiment, the educational content 416 is included within the database 414.

The system 400 additionally can include one or more operator interfaces 450 to allow the entry of parameters, conditions, data, control information, as well as allowing operators to monitor the system and educational process. The operator interface can be implemented through a computer or other device allowing data and/or instructions to be added and/or altered in the system 400. One or more local user or student interfaces 452 can additionally be included in the system and directly coupled with processor 402 and memory 404. The local users can be students in classrooms, students in testing or lab centers, trained raters collecting data to be analyzed, and other such users. In one embodiment, these local user interfaces 452 can be controlled by the processor 402 and have direct access to parts or all of the memory 404. Typically, each user interface includes an internal processor, memory and system interface, for operation and local storage of data, educational content and other similar data.

A network interface 454 can also be included in the system 400 to allow the system to couple with a large network 456, such as the Internet. The network interface 454 can be directly coupled with the network 456 or can couple to the network through the network bus 406. Coupling with the network 456 allows the system to remotely access additional remote storage and/or memory devices 460 that is maintained by the system 400 or other system, such as educational institutions other research facilities and other stores of data. Additionally, other local networks 400 can be remotely coupled with to allow exchange of data, educational content, data evaluations and substantially any other information.

The system can also be remotely accessed by one or more operator interfaces 462 to allow remote access to the system and control of the system 400. Remote students or uses 464 can additionally access the system to receive training from the system 400. For example, the remote users can be students studying or receiving training at their homes, it can be one or more interfaces at a company site collecting data from raters for analysis of the data. The remote users can be one or more interfaces at a company site receiving training. It will be apparent to those skilled in the art that any type, number and variation of users can access the system, once given access, without departing from the inventive aspects of the present invention.

Additionally, other systems 401 similar to system 400 can be remotely located and linked to system 400 through the network, internet and/or intranet 456. Thus, the present systems can include a number of sub-systems operating in any number of locations to collect data and/or provide training.

As described above, the present systems and methods define conventions to specify the implementation practice to be applied during the administration of a subjective measurement device. The systems and methods also provide for the standardization of the defined conventions to be conducted in a manner that accommodates the specificity requirements of both the subject matter and environment to which the measurement tool is to be administered. The present methods and systems further provide for processes to facilitate the formation of an expert advisory panel or board to establish a standardization of conventions or benchmark.

The invention additionally provides for the development of subject matter specific educational content and materials, as well as training procedures which utilize the measurement device and statistical capabilities as described above, in accordance with the standards set forth by the experts. The training procedures provided by the present invention are to be used in conjunction with the standardized conventions to construct the platform in which reliability and validity assessments of rater performance can be made, relative to their administration of the measurement device to specific subject matter. These assessments are derived as the product of a comprehensive statistical analysis of the administered measurement event, scrutinizing rater performance against one or a plurality of different comparisons and simulations. The nature of the measurement technique ultimately determines the criteria and methods to be involved in the analytical process, which can range from a simple comparison of the rater's measurement response with the outcomes defined within the standardized conventions, to the comparison of rater performance with the performance of an artificial investigator simulated by a neural network, and/or other random/chance modules. Utilization of computer applications allows the analytical process to be conducted both in retrospect to the measurement event, as well as directly within the training environment.

The analysis in retrospect allows for a cumulative summary analysis to be performed after the training session has concluded, allowing performance assessments to be constructed and communicated through a multitude of tangible representations upon which meaningful interpretations can be made, documented, and reported.

Implementing the analysis during training and/or within the training environment provides for details of proactive and reactive rater participation to be recorded as they are exhibited within the training exercise, making them immediately available for statistical transformation and processing. The present invention utilizes the performance assessment during training to implement dynamic recalibration of the educational content, material, and training procedure in real time. Modulating the educational process in this manner allows the focus of the training to adapt to and reorganize around specific strengths and deficits exhibited by the rater (as interpreted in the analytical process) without compromising the integrity of the standardized conventions outlining appropriate practice. Dynamic specialization of the training technique is thus invoked as a means in which to effectively communicate more relevant information during the remainder of the exercise, and to do so in a manner predicted to better accommodate the academic and cognitive requirements of the student rater.

Consequently, the systems and methods of the present invention provide for more practical means of standardizing and documenting guidelines for administrating subjective measurement tools, allowing more content specific educational materials and robust training procedures to be contrived. This educational process endowed by the disclosed invention thus affords greater accuracy and precision of rater or investigator performance assessments than are obtainable through previous systems.

The present invention has been described using examples of statistically analyzing and evaluating data collected, for example, relative to the effectiveness of an antidepressant pharmaceutical compound (i.e., the HAMD measurement tool). Further, the present invention has been described regarding the training of individuals and the evaluation of individual performances in relation to an interviewer administering subjective measurement tools, such as the HAMD measurement technique.

However, it will be apparent to one skilled in the art that the statistical analysis performed on the collected data can be equally applied to substantially any data, and particularly to subjective data, without departing from the inventive aspects of the present invention. Further, it will be apparent to one skilled in the art that the training methodologies and systems described can equally be applied to substantially any training, and particularly for training individuals for performing subjective analysis of an object, such as product performance (e.g., cars, toothpaste, tools, cookware, and other such products), customer service (e.g., in department stores, with airlines, auto dealers, and other such entities providing service), patient care (e.g., from doctors, nurses, dentists, hospitals and retirement homes), customer satisfaction, drug effectiveness, and substantially any other subjectively collected data, without departing from the novelty of the present invention.

While the invention herein disclosed has been described by means of specific embodiments and applications thereof, numerous modifications and variations could be made thereto by those skilled in the art without departing from the scope of the invention.

What is claimed is:

1. A method for analyzing collected data, comprising:
   collecting data about a plurality of objects;
   determining a measure of agreement between the collected data and a benchmark;
   determining a reliability of the collected data;
   determining a variance of the collected data relative to the benchmark; and
   performing a significance assessment based on the variance of the collected data;
   wherein the step of performing the significance assessment includes assessing the collected data relative to a random data distribution.

2. A method for analyzing collected data, comprising:
   collecting data about a plurality of objects;
   determining a measure of agreement between the collected data and a benchmark;
   determining a reliability of the collected data;
   determining a variance of the collected data relative to the benchmark;
   determining an erraticity of each of the plurality of objects; and
   weighting the collected data based on the determined erraticity of at least one of the plurality of objects.

3. The method as claimed in claim 2, further comprising the steps of:
   determining weighted mean squared errors (MSE) or the collected data based on the determined erraticity; and
   the step of weighting the collected data including applying the weighted MSE.

4. A method for training a plurality of raters for rating at least one of a plurality of objects, the method comprising:
   instructing a plurality of raters regarding performing a rating of at least one of a plurality of objects;
   allowing each of the plurality of raters to collect data that rates at least one of the plurality of objects;
   determining a measure of agreement of the data collected by a single rater with benchmark data;
   determining the reliability of the data collected by the single rater;
   determining the variance of the data collected by the single rater relative to the benchmark data;
   evaluating the single rater relative to the benchmark data;
   determining an erraticity for each of the plurality of objects;
   weighting the collected data of an object of the plurality of objects based on the erraticity of the object; and
   the step of determining the variance including determining the variance based on the weighted data for the single rater.

5. A method of statistically analyzing data, comprising:
   collecting a plurality of sets of data based from a plurality of evaluations of an object, where each set of data includes a plurality of data;
   comparing each set of data with each of the other sets of data;
   determining a deviation of the sets of data;
   determining a difficulty in evaluating the object base on the determination of the deviation of the sets of data;
   wherein the collecting the plurality of sets of data includes collecting the plurality of sets of data based on a plurality of expert evaluations of the object, such that the plurality of sets of data are a plurality of expert sets of data;
   collecting a plurality of rating sets of data from a plurality of raters evaluating the object;
   determining a measure of disagreement between each rating set of data and each expert set of data;
   establishing a weight-correction of each measure of disagreement based on the difficulty in evaluating the object;
   generating a weight corrected measure of disagreement;
   determining if each weight corrected measure of disagreement exceeds a threshold; and
   retraining a rater who generated the rating set of data having weight corrected measure of disagreement that exceeds the threshold.

6. A method of statistically analyzing data, comprising:
   collecting a plurality of sets of data based from a plurality of evaluations of an object, where each set of data includes a plurality of data;
   comparing each set of data with each of the other sets of data;
   determining a deviation of the sets of data; and
   determining a difficulty in evaluating the object based on the determination of the deviation of the sets of data;
   wherein the establishing the weight-correction for each measure of disagreement includes a maximum disagreement weight.

7. A system for statistically analyzing data, comprising:
   means for collecting a set of data from a rater;
   means for comparing the set of data with a standards of convention;
   means for determining a distance measure between the set of data and the standards of convention;
   means for evaluating the set of data based on the distance measure;
   means for certifying the data if the evaluation exceeds a threshold;
   means for establishing a null hypotheses;
   means for determining if the set of data exceeds a threshold; and
   means for rejecting the null hypotheses if the distance measure exceeds the threshold.

8. A system for statistically analyzing data, comprising:
   means for collecting a set of data from a rater;
   means for comparing the set of data with a standards of convention;
   means for determining a distance measure between the set of data and the standards of convention;
   means for evaluating the set of data based on the distance measure;
   means for certifying the data if the evaluation exceeds a threshold;
   means for establishing a null distribution;
   means for establishing a threshold based on the null distribution; and
   means for determining if the set of data exceeds the threshold, such that the means for certifying certifies the set of data if the set of data exceeds the threshold.

* * * * *

UNITED STATES PATENT AND TRADEMARK OFFICE
CERTIFICATE OF CORRECTION

PATENT NO. : 6,795,793 B2
DATED : September 21, 2004
INVENTOR(S) : Shayegan et al.

It is certified that error appears in the above-identified patent and that said Letters Patent is hereby corrected as shown below:

Column 51,
Line 33, after "(MSE)" change "or" to -- for --.
Line 66, after "object" change "base" to -- based --.

Signed and Sealed this

Twenty-third Day of August, 2005

JON W. DUDAS
*Director of the United States Patent and Trademark Office*